(12) United States Patent
Kurokawa

(10) Patent No.: US 7,559,266 B2
(45) Date of Patent: Jul. 14, 2009

(54) TELESCOPIC SHAFT

(75) Inventor: Yoshifumi Kurokawa, Maebashi (JP)

(73) Assignee: NSK Ltd., Tokyo (JP)

( * ) Notice: Subject to any disclaimer, the term of this patent is extended or adjusted under 35 U.S.C. 154(b) by 194 days.

(21) Appl. No.: 11/769,396

(22) Filed: Jun. 27, 2007

(65) Prior Publication Data
US 2008/0000316 A1     Jan. 3, 2008

(30) Foreign Application Priority Data

Jun. 29, 2006  (JP) .............................. 2006-180318
Mar. 26, 2007  (JP) .............................. 2007-078876

(51) Int. Cl.
*B62D 1/16*     (2006.01)

(52) U.S. Cl. ..................... 74/492; 403/359.1; 180/89.12

(58) Field of Classification Search ................... 74/492, 74/493; 403/559.5; 464/167; 180/89.12; 280/775, 777
See application file for complete search history.

(56) References Cited

U.S. PATENT DOCUMENTS

| | | | |
|---|---|---|---|
| 4,667,530 A | 5/1987 | Mettler et al. | |
| 5,152,627 A | 10/1992 | Arnold | |
| 5,243,874 A | 9/1993 | Wolfe et al. | |
| 5,383,811 A | 1/1995 | Campbell et al. | |
| 5,460,574 A | 10/1995 | Hobaugh | |
| 5,507,203 A | 4/1996 | Audibert et al. | |
| 5,509,324 A | 4/1996 | Cymbal | |
| 6,149,526 A | 11/2000 | Boersma et al. | |
| 6,200,225 B1 | 3/2001 | Hobaugh, II | |
| 6,557,433 B1 * | 5/2003 | Castellon | 74/492 |
| 2005/0257639 A1 * | 11/2005 | Yamada | 74/493 |
| 2007/0026952 A1 * | 2/2007 | Gokano | 462/162 |

FOREIGN PATENT DOCUMENTS

| | | |
|---|---|---|
| DE | 3624473 A1 | 1/1987 |
| EP | 1167790 B1 | 1/2005 |
| JP | 63-043013 A | 2/1988 |
| JP | 05-116633 A | 5/1993 |
| JP | 11-082530 A | 3/1999 |
| JP | 11-208484 A | 8/1999 |
| JP | 2000-074081 A | 3/2000 |
| WO | 94/25325 A1 | 11/1994 |
| WO | 02/02388 A1 | 1/2002 |

OTHER PUBLICATIONS

Extended European Search Report dated Feb. 20, 2009.

* cited by examiner

*Primary Examiner*—David M Fenstermacher
(74) *Attorney, Agent, or Firm*—Sughrue Mion, PLLC

(57) ABSTRACT

This invention provides a telescopic shaft in which a backlash or a sliding resistance in a rotational direction is maintained to a predetermined value even when there are fabrication errors in a male shaft and a female shaft, and a preload is not reduced even when a sleeve is worn by a friction force in sliding, and a steering apparatus having the telescopic shaft. An inclined sleeve portion 712 is pressed by an elastic deformation of an urge sleeve portion 713, so that there is not backlash between a male shaft 12B and a female shaft 12A and a predetermined preload is applied. Although an outer periphery of the inclined sleeve portion 712 is worn by a friction in sliding, the inclined sleeve portion 712 is further pressed by an elastic force of the urge sleeve portion 713 by an amount of wearing the outer periphery of the inclined sleeve portion 712. Thus, a predetermined urge force is always operated to the inclined sleeve portion 71.

19 Claims, 20 Drawing Sheets

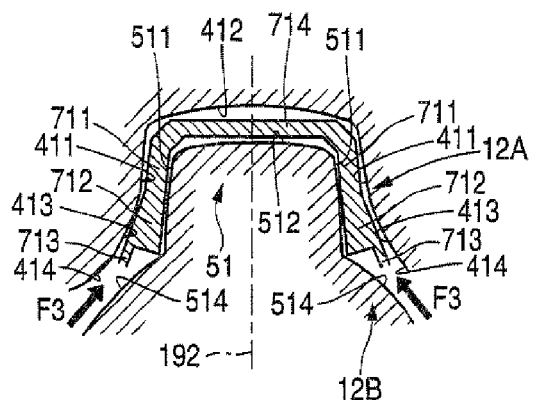
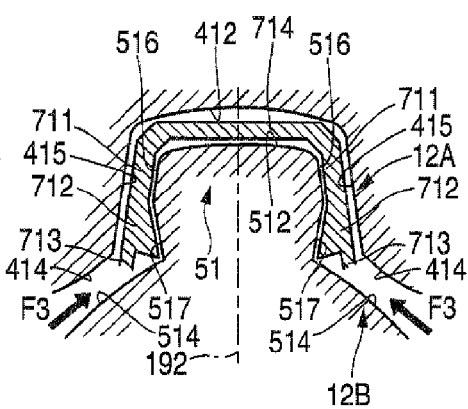
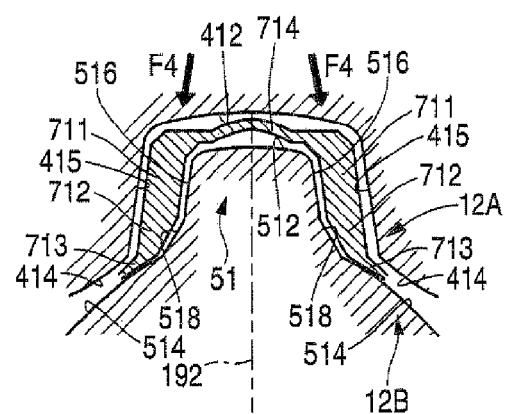
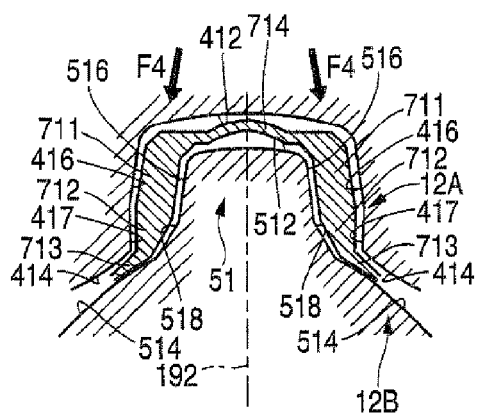
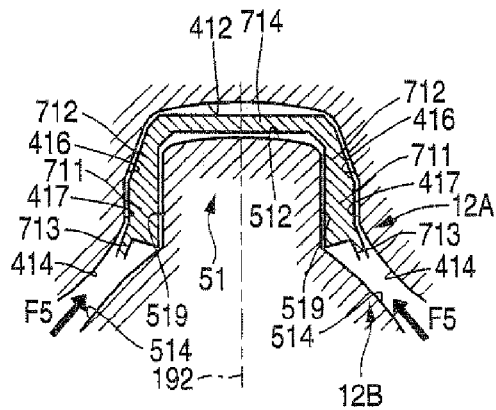

TELESCOPIC SHAFT

This application is based on and claims the benefit of priority from the prior Japanese Patent Application No. 2006-180318, filed on Jun. 29, 2006 and No. 2007-078876, filed on Mar. 26, 2007, the entire contents of which are hereby incorporated by reference.

BACKGROUND OF THE INVENTION

1. Technical Field

The present invention relates to a telescopic shaft. Particularly, the present invention relates to a telescopic shaft capable of transmitting a rotational torque and relatively movable in an axial direction, such as a telescopic shaft of an intermediate shaft and a steering shaft. Further, the invention relates to a steering apparatus having a telescopic shaft.

2. Background Art

In a steering apparatus, a telescopic shaft capable of transmitting a rotational torque and connected relatively movably in an axial direction is incorporated in an intermediate shaft, a steering shaft or the like. That is, an intermediate shaft needs to be provided with a telescopic function by which when an universal joint is fastened to a pinion shaft brought in mesh with a rack shaft of a steering gear, the intermediate shaft is temporarily contracted and thereafter fitted to the pinion shaft to fasten.

Further, a steering shaft needs to transmit a steering force of a steering wheel to a wheel and adjust a position of the steering wheel in an axial direction in accordance with a physical constitution or a driving attitude of a driver. Thus, a telescopic function is requested therefor.

In order to realize an excellent operability of the steering wheel with the telescopic shaft, it is necessary that backlash in a rotational direction between a male shaft and a female shaft slidable relative to each other is small and a sliding resistance in the axial direction between the male shaft and the female shaft is maintained at a predetermined sliding resistance over a long period of time. Such a telescopic shaft is disclosed in Japanese Patent Document 1 (JP-A-11-208484) and Japanese Patent Document 2 (JP-A-5-116633).

A telescopic shaft of Patent Document 1 is constituted by a male shaft having a noncircular outer periphery, a female shaft having a noncircular inner periphery, and an elastically deformable slide sleeve inserted to a gap between the outer periphery of the male shaft and the inner periphery of the female shaft and having a constant wall thickness. The gap between the outer periphery of the male shaft and the inner periphery of the female shaft is changed along a peripheral direction. Thus, the slide sleeve alternately comes in contact with the outer periphery of the male shaft and the inner periphery of the female shaft. The slide sleeve is bent as contact portion constitutes a fulcrum, and a preload is applied to between the male shaft and the female shaft.

According to the telescopic shaft of Patent Document 1, when fabrication errors of the outer periphery of the male shaft and the inner periphery of the female shaft are increased, an amount of bending the slide sleeve is changed such that the preload is varied. Therefore, the backlash in the rotational direction or the sliding resistance between the male shaft and the female shaft is deviated from a predetermined value. Further, when the contact portion of the slide sleeve is worn by a telescopic motion between the male shaft and the female shaft, the preload is reduced such that the backlash in the rotational direction between the male shaft and the female shaft is increased.

A telescopic shaft of Patent Document 2 comprises a male shaft having a noncircular outer periphery, a female shaft having a noncircular inner periphery, and two wedge pieces interposed between the outer periphery of the male shaft and the inner periphery of the female shaft. Further, two wedge pieces are interposed at a gap between two slide bushes integrally formed with the male shaft and are urged in directions separated from each other by a spring.

According to the telescopic shaft of Patent Document 2, a number of parts is so large that a fabrication cost is increased and fabrication errors of parts accumulates. Thus, it is difficult to achieve backlash in a predetermined direction or a slide resistance. Further, owing to a structure of arranging the slide bushes at both end portions in the axial direction of the male shaft and arranging the wedge pieces on inner sides thereof, the both end portions in the axial direction of portions of fitting the male shaft and the female shaft are operated with the preload by the wedge pieces. Therefore, it is insufficient to exclude backlash in a fold-to-bend direction (moment direction), and when a spring force is strengthened in order to exclude backlash in the fold-to-bend direction (moment direction) the sliding resistance becomes excessively large.

SUMMARY OF THE INVENTION

This invention provides a telescopic shaft having the following features. That is, a variation of a preload is small even when there are fabrication errors of a male shaft and a female shaft. Backlash in a rotational direction or a sliding resistance between the male shaft and the female shaft is maintained at a predetermined value. Even when an elastically deformable sleeve interposed at a gap between the male shaft and the female shaft is worn by a friction force in being slid, the preload is not reduced. Further, this invention provides a steering apparatus having the telescopic shaft.

The above-described problem is achieved by the following means. That is, a first aspect of the present invention provides a telescopic shaft including: a male shaft having a noncircular outer peripheral shape; a female shaft having a noncircular inner peripheral shape, being outwardly fitted to an outer periphery of the male shaft so as to move relative thereto in an axial direction and transmit a rotational torque; an inclined gap formed at a gap between the noncircular outer periphery and the noncircular inner periphery, and changing an interval therebetween at a predetermined inclination; an inclined sleeve portion inserted to the inclined gap, and always coming into contact with both the noncircular inner periphery of the female shaft and the noncircular outer periphery of the male shaft; and an urge sleeve portion capable of an elastic deformation, inserted to the gap between the noncircular outer periphery and the noncircular inner periphery, and urging the inclined sleeve portion from a side of a maximum gap portion of the inclined gap toward a side of a minimum gap portion thereof to apply a preload.

According to a second aspect of the present invention as set forth in the first aspect of the present invention, it is preferable that either one of the inner periphery of the female shaft or the outer periphery of the male shaft is formed with a plurality of axial grooves substantially radially from an axis center, wherein other of the inner periphery of the female shaft or the outer periphery of the male shaft is formed with a plurality of axial projected streaks having gaps between the axial grooves, at positions of phases the same as positions of phases of the axial grooves substantially radially from the axis center, and wherein the inclined sleeve portion and the urge sleeve portion are inserted to the gaps formed between the axial grooves and the axial projected streaks.

According to a third aspect of the present invention as set forth in the first aspect of the present invention, it is preferable that a plurality of partial sleeves constituted by two elements of the inclined sleeve portion and the urge sleeve portion are arranged at the gap between the noncircular outer periphery and the noncircular inner periphery, and both ends of the partial sleeves are continuously connected to each other so as to be formed in a ring-like shape.

According to a fourth aspect of the present invention as set forth in the first aspect of the present invention, it is preferable that a wedge angle of the inclined sleeve portion is set to be equal to or smaller than a friction angle of the inclined sleeve portion.

A fifth aspect of the present invention provides a telescopic shaft comprising: a male shaft having a noncircular outer peripheral shape; a female shaft having a noncircular inner peripheral shape outwardly fitted to an outer periphery of the male shaft so as to move relative thereto in an axial direction and transmit a rotational torque; a parallel gap formed at a gap between the noncircular outer periphery and the noncircular inner periphery and having a substantially constant interval; an inclined gap formed at the gap between the noncircular outer periphery and the noncircular inner periphery, and changing an interval therebetween at a predetermined inclination, and continuously connecting either one of a maximum gap portion or a minimum gap portion to the parallel gap; a parallel sleeve portion capable of an elastic deformation, being inserted to the parallel gap and coming into contact with both the noncircular inner periphery of the female shaft and the noncircular outer periphery of the male shaft when a predetermined rotational torque is operated thereto; an inclined sleeve portion capable of an elastic deformations being inserted to the inclined gap, continuously connected to the parallel sleeve portion, and always coming into contact with both the noncircular inner periphery of the female shaft and the noncircular outer periphery of the male shaft; and an urge sleeve portion capable of an elastic deformation, being inserted to the gap between the noncircular outer periphery and the noncircular inner periphery, continuously connected to the parallel sleeve portion or the inclined sleeve portion, and urging the inclined sleeve portion from a side of a maximum gap portion of the inclined gap toward a side of a minimum gap portion thereof to apply a preload.

According to a sixth aspect of the present invention as set forth in the fifth aspect of the present invention, it is preferable that a wedge angle of the inclined sleeve portion is set to be larger than a friction angle of the inclined sleeve portion.

According to a seventh aspect of the present invention as set forth in the fifth aspect of the present invention, it is preferable that the outer periphery of the male shaft and the inner periphery of the female shaft are formed in a rectangular shape, and the parallel sleeve portion, the inclined sleeve portion and the urge sleeve portion are inserted to a gap formed between the rectangular outer periphery and the rectangular inner periphery.

According to an eighth aspect of the present invention as set forth in the fifth aspect of the present invention, it is preferable that either one of the inner periphery of the female shaft or the outer periphery of the male shaft is formed with a plurality of axial grooves substantially radially from an axis center, and other of the inner periphery of the female shaft or the outer periphery of the male shaft is formed with a plurality of axial projected streaks having gaps between the axial grooves, at positions of phases the same as positions of phases of the axial grooves substantially radially from the axis center, and the parallel sleeve portion, the inclined sleeve portion and the urge sleeve portion are inserted to a gap formed between the axial grooves and the axial projected streaks.

According to a ninth aspect of the present invention as set forth in the first aspect of the present invention, it is preferable that the inclined sleeve portion and the urge sleeve portion are fixed to the outer periphery of the male shaft to be unable to move relative thereto in the axial direction.

According to a tenth aspect of the present invention as set forth in the first aspect of the present invention, it is preferable that a recess portion for storing a lubricant is formed at a face of at least any one of the inclined sleeve portion or the urge sleeve portion, coming into contact with the inner periphery of the female shaft, or the inner periphery of the female shaft.

According to an eleventh aspect of the present invention as set forth in the first aspect of the present invention, it is preferable that the parallel sleeve portion, the inclined sleeve portion and the urge sleeve portion are fixed to the inner periphery of the female shaft to be unable to move relative thereto in the axial direction.

According to a twelfth aspect of the present invention as set forth in the first aspect of the present invention, it is preferable that the parallel sleeve portion is movable in a peripheral direction along the parallel gap, and the inclined sleeve portion is movable in the peripheral direction along the inclined gap.

According to a thirteenth aspect of the present invention as set forth in the first aspect of the present invention, it is preferable that urge sleeve portion is formed to come into contact with at least any one of the outer periphery of the male shaft or the inner periphery of the female shaft.

According to a fourteenth aspect of the present invention as set forth in the first aspect of the present invention, it is preferable that the urge sleeve portion is formed in a waveform shape.

According to a fifteenth aspect of the present invention as set forth in the first aspect of the present invention, it is preferable that the urge sleeve portion is formed to be more thin-walled than the inclined sleeve portion.

According to a sixteenth aspect of the present invention as set forth in the first aspect of the present invention, it is preferable that a plurality of partial sleeves constituted by three elements of the parallel sleeve portion, the inclined sleeve portion and the urge sleeve portion are arranged at the gap between the noncircular outer periphery and the noncircular inner periphery, and both ends of the partial sleeves are continuously connected to each other so as to be formed in a ring-like shape.

According to a seventeenth aspect of the present invention as set forth in the first aspect of the present invention, it is preferable that the partial sleeve is outwardly fitted to the outer periphery of the male shaft, and then the inner periphery of the female shaft is outwardly fitted to the outer periphery of the male shaft, and then the outer periphery of the female shaft is pressed to contract a diameter thereof.

An eighteenth aspect of the present invention provides a telescopic shaft comprising: a male shaft; a female shaft outwardly fitted to the male shaft so as to move relative thereto in an axial direction and transmit a rotational torque; a plurality of axial grooves formed at either of an inner periphery of the female shaft, or an outer periphery of the male shaft substantially radially from an axis center; a plurality of axial projected streaks formed at other of the inner periphery of the female shaft or the outer periphery of the male shaft at positions of phases the same as positions of phases of the axial grooves substantially radially from the axis center and having gaps between the axial grooves; a parallel gap formed at the gap between the axial groove and the axial projected streak and having a substantially constant interval in a radial direction; an inclined gap formed at the gap between the axial groove and the axial projected streak, changing an interval in the radial direction at a predetermined inclination, and continuously connecting either of a maximum gap portion or a minimum gap portion thereof to the parallel gap; a parallel sleeve portion capable of an elastic deformation, being inserted to the parallel gap and coming into contact with both the inner periphery of the female shaft and the outer periphery of the male shaft when a predetermined rotational torque is operated thereto; an inclined sleeve portion capable of an elastic deformation, being inserted to the inclined gap, continuously connected to the parallel sleeve portion, and always coming into contact with both the inner periphery of the female shaft and the outer periphery of the male shaft; and an urge sleeve portion capable of an elastic deformation, being inserted to the gap between the axial groove and the axial projected streak, continuously connected to the parallel sleeve portion or the inclined sleeve portion, and urging the inclined sleeve portion from a side of a maximum gap portion of the inclined gap toward a side of a minimum gap portion thereof to apply a preload.

According to a nineteenth aspect of the present invention as set forth in the first aspect of the present invention, a steering apparatus including the telescopic shaft is provided.

According to a twentieth aspect of the present invention as set forth in the second aspect of the present invention, it is preferable that a plurality of partial sleeves constituted by two elements of the inclined sleeve portion and the urge sleeve portion are arranged at the gaps between the axial grooves and the axial projected streaks, and both ends of the partial sleeves are continuously connected to each other so as to be formed in a ring-like shape.

According to a twenty-first aspect of the present invention as set forth in the fifth aspect of the present invention, it is preferable the parallel sleeve portion, the inclined sleeve portion, and the urge sleeve portion are formed of a material of any one of natural rubber, synthetic rubber, a mixture of natural rubber and synthetic rubber, or a material including at least any one of a solid lubricant of molybdenum disulfide, graphite, a fluorine compound to any one of natural rubber, synthetic rubber, a mixture of natural rubber and synthetic rubber.

According to a twenty-second aspect of the present invention as set forth in the fifth aspect of the present invention, it is preferable that the parallel sleeve portion, the inclined sleeve portion, and the urge sleeve portion are formed of a material being based on a polymer material of at least any one of polytetrafluoroethylene, phenolic resin, acetal resin, polyimide resin, polyamideimide resin, polyether sulfonic resin, polyphenylene sulfide resin, and the material including at least any one of a solid lubricant of molybdenum disulfide, graphite and a fluorine compound.

According to a twenty-third aspect of the present invention as set forth in the fifth aspect of the present invention, it is preferable that the parallel sleeve portion, the inclined sleeve portion, and the urge sleeve portion are formed of a material being based on a polymer material of at least anyone of a polymer material of polytetrafluoroethylene, phenolic resin, acetal resin, polyimide resin, polyamideimide resin, polyether sulfonic resin, polyphenylene sulfide resin, and the material including at least one of carbon fiber and carbon beads.

According to a twenty-fourth aspect of the present invention as set forth in the twentieth aspect of the present invention, it is preferable that the parallel sleeve portion, the inclined sleeve portion and the urge sleeve portion are formed by an injection molding.

According to a twenty-fifth aspect of the present invention as set forth in the fifth aspect of the present invention, it is preferable that the parallel sleeve portion, the inclined sleeve portion and the urge sleeve portion are formed of a spring steel.

According to a twenty-sixth aspect of the present invention as set forth in the fifth aspect of the present invention, it is preferable that the female shaft and the male shaft are formed of any one of steel including 0.04% or more of carbon, an aluminum alloy and a polymer material.

According to a twenty-seventh aspect of the present invention as set forth in the fifth aspect of the present invention, it is preferable that the female shaft and the male shaft are formed by any one of cold forging, hot forging, pressing, swaging, drawing, extruding and machining.

According to a twenty-eighth aspect of the present invention as set forth in the ninth aspect of the present invention, it is preferable that axial both ends of at least any one of the parallel sleeve portion, the inclined sleeve portion and the urge sleeve portion come into contact with a projected portion formed by being projected to an outer side in a radial direction at the outer periphery of the male shaft to be fixed to the outer periphery of the male shaft to be unable to move relative thereto in the axial direction.

According to a twenty-ninth aspect of the present invention as set forth in the eleventh aspect of the present invention, it is preferable that a recess portion for storing a lubricant is formed at a face of at least any one of the parallel sleeve portion, the inclined sleeve portion or the urge sleeve portion, coming into contact with the outer periphery of the male shaft, or the outer periphery of the male shaft.

According to a thirtieth aspect of the present invention as set forth in the eleventh aspect of the present invention, it is preferable that the parallel sleeve portion is movable in a radial direction along the parallel gap, and the inclined sleeve portion is movable in the radial direction along the inclined gap.

According to a thirty-first aspect of the present invention as set forth in the eighth aspect of the present invention, it is preferable that a plurality of partial sleeves constituted by three elements of the parallel sleeve portion, the inclined sleeve portion and the urge sleeve portion are arranged at the gap between the axial groove and the axial projected streak, and both ends of the partial sleeves are continuously connected to each other so as to be formed in a ring-like shape.

According to the telescopic shaft and the steering apparatus of the first aspect to the ninth aspect of the invention, the eleventh aspect to the twelfth aspect of the invention, and the twentieth aspect to the twenty-eighth aspect of the invention, the inclined sleeve portion is pressed to the inclined gap by the elastic deformation of the urge sleeve portion. Thus, even when there are fabrication errors of the male shaft and the female shaft, a variation of the preload is small, and thus backlash or sliding resistance in the rotational direction between the male shaft and the female shaft is maintained at a predetermined value. Further, even when the inclined sleeve portion is worn by a friction in sliding, by an elastic force of the urge sleeve portion, the inclined sleeve portion is pressed to the inclined gap, and therefore, the preload is not reduced.

According to the telescopic shaft of the tenth aspect and the twenty-ninth aspect of the invention, and the steering apparatus, the recess portion for storing the lubricant is formed at the face of the female shaft coming into contact with the sleeve portion, or at the face of the outer periphery of the male shaft coming into contact with the sleeve portion Therefore, the lubricant is stably supplied over the long period of time and the sliding resistance is maintained to be small over a long period of time.

According to the telescopic shaft of the seventeenth aspect of the invention, and the steering apparatus, the sleeve portion is outwardly fitted to the outer periphery of the male shaft, and then the inner periphery of the female shaft is outwardly fitted to the outer periphery of the sleeve portion, and then the outer periphery of the female shaft is pressed to contract the diameter. Therefore, the telescopic shat having very small backlash can be formed.

BRIEF DESCRIPTION OF THE DRAWINGS

FIG. 3A is an enlarged sectional view taken along a line II-II of FIG. 2, and FIG. 3B is a sectional view enlarging U portion of FIG. 3A;

FIG. 6A shows a state in which a rotational torque is not loaded between the male shaft and the female shaft, and FIG. 6B shows a state of loading the rotational torque between the male shaft and the female shaft;

FIG. 8A is a perspective view showing a state of outwardly fitting a sleeve formed with a recess portion for storing a lubricant at an outer periphery thereof to an outer periphery of the male shaft, and FIG. 8B is a front view viewing FIG. 8B from a P arrow mark direction;

FIGS. 9A to 9E illustrate enlarged sectional views showing various examples of inclined gaps and parallel gaps;

FIG. 17A is the enlarged sectional view taken along the line II-II of FIG. 2, and FIG. 17B is an enlarged sectional view of W portion of FIG. 17A;

DESCRIPTION OF PREFERRED EMBODIMENTS

Embodiment 1 through Embodiment 7 of the invention will be explained in reference to the drawings as follows.

Embodiment 1

Figure 1:
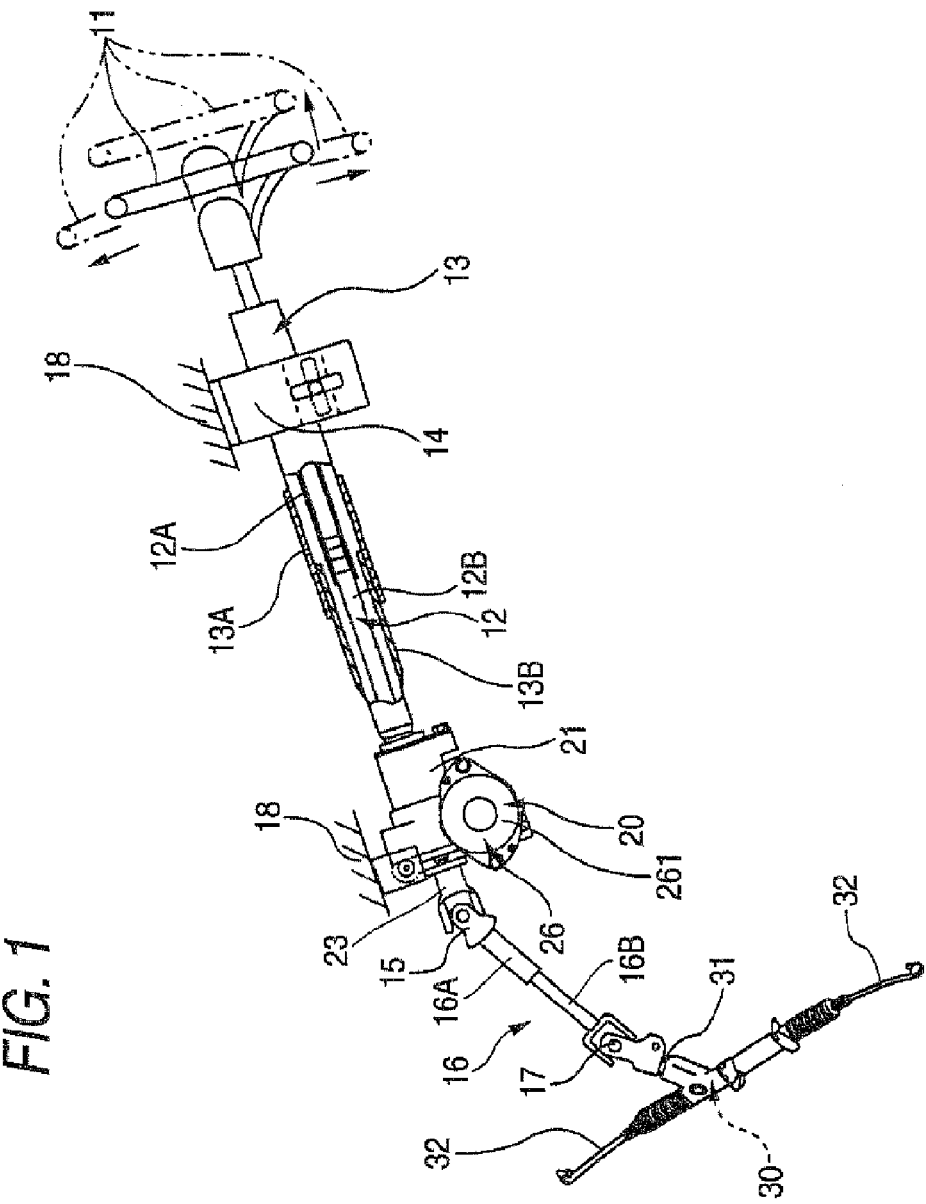
FIG. 1 is a partially cut front view showing a total of a steering apparatus according to Embodiment 1 of the invention, showing an embodiment applied to an electric power steering apparatus having a steering assist portion.
Figure 2:
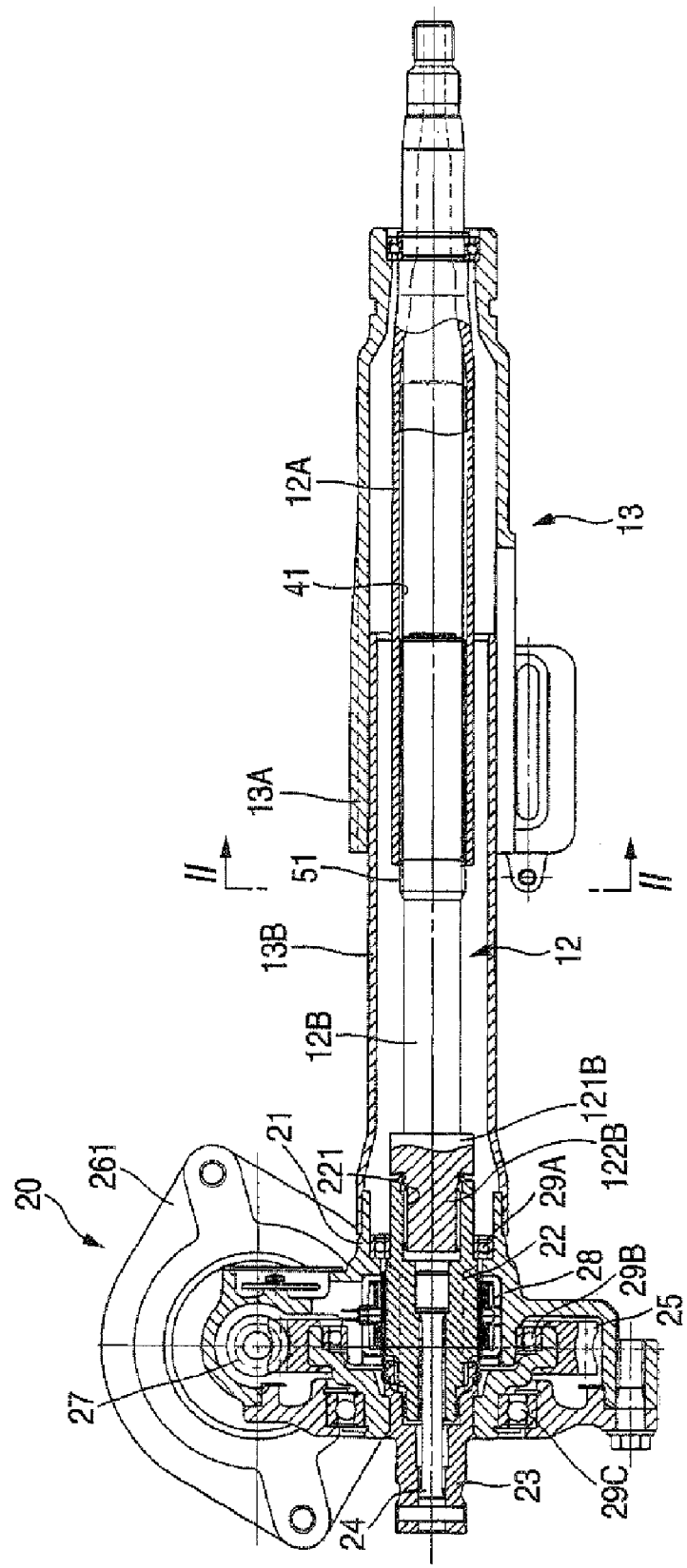
FIG. 2 is a vertical sectional view of an essential portion of FIG. 1.

FIG. 1 is a Partially Cut Front View Showing a Total of a steering apparatus of Embodiment 1 of the invention, showing an embodiment applied to an electric power steering apparatus having a steering auxiliary portion. FIG. 2 is a vertical sectional view of an essential portion of FIG. 1.

Figure 3A:
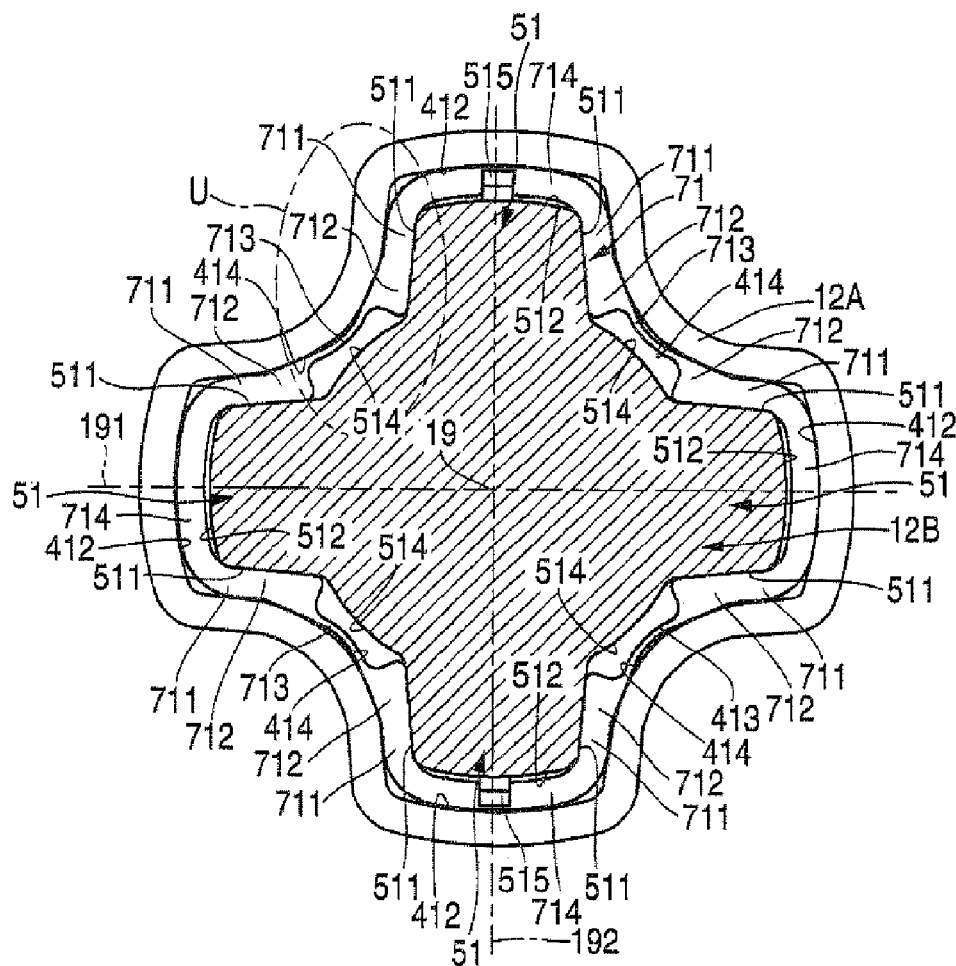
FIGS. 3A and 3B show a telescopic shaft according to Embodiment 1 of the invention.
Figure 3B:
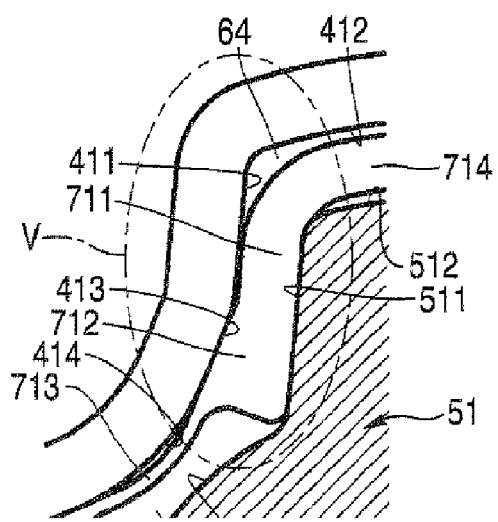
Figure 4:
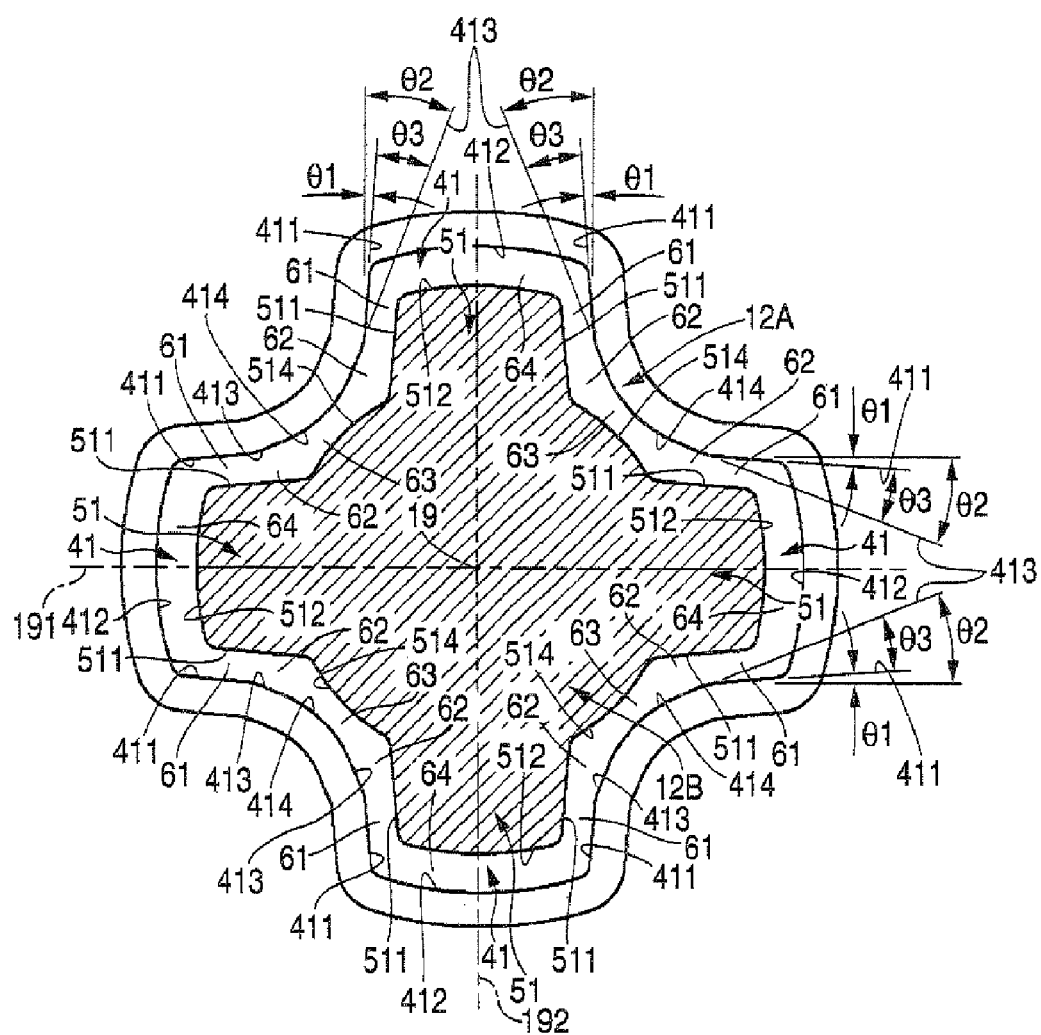
FIG. 4 is an enlarged sectional view showing only a male shaft and a female shaft by detaching a sleeve from FIG. 3A.
Figure 5:
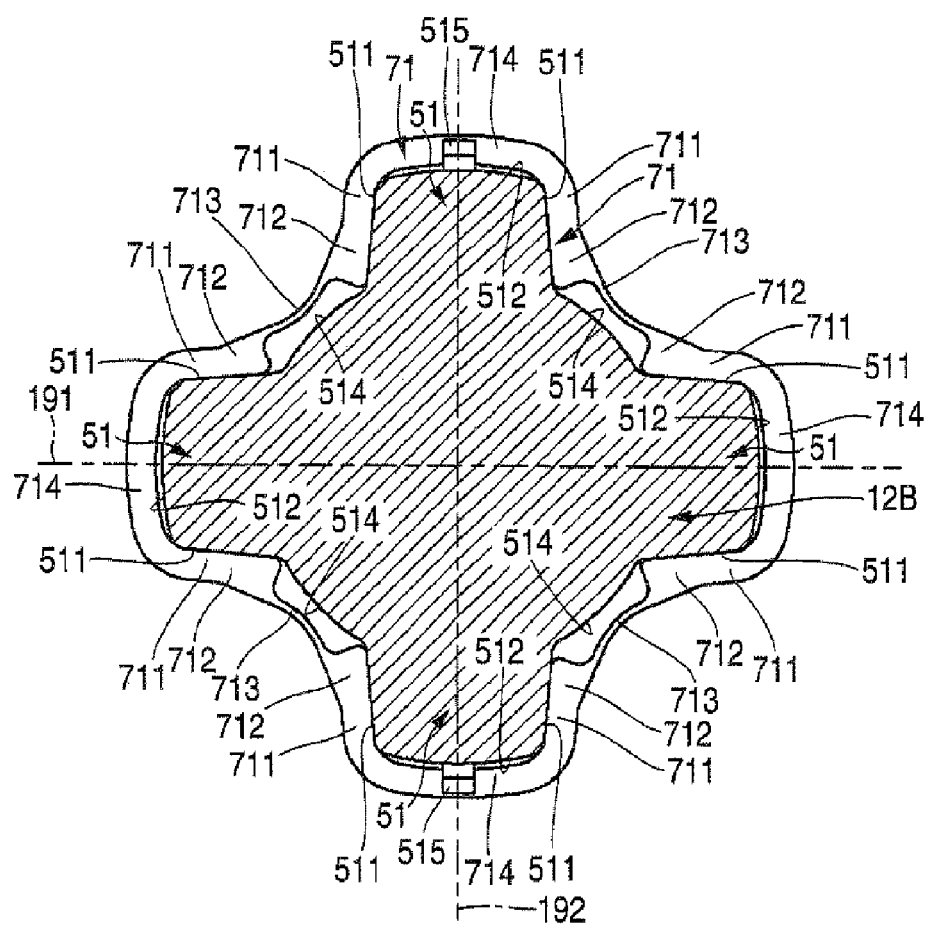
FIG. 5 is an enlarged sectional view showing a state of the male shaft to which the sleeve is attached before the female shaft is outwardly fitted thereto in FIG. 3A.

FIGS. 3A and 3B show a telescopic shaft of Embodiment 1 of the invention, FIG. 3A is an enlarged sectional view taken along a line II-II of FIG. 2, FIG. 3B is a sectional view enlarging U portion of FIG. 3A. FIG. 4 is an enlarged sectional view showing only a male shaft and a female shaft by detaching a sleeve from FIG. 3A. FIG. 5 is an enlarged sectional view showing a state of attaching the sleeve to the male shaft and before outwardly fitting the female shaft before in FIG. 3A.

Figure 6:
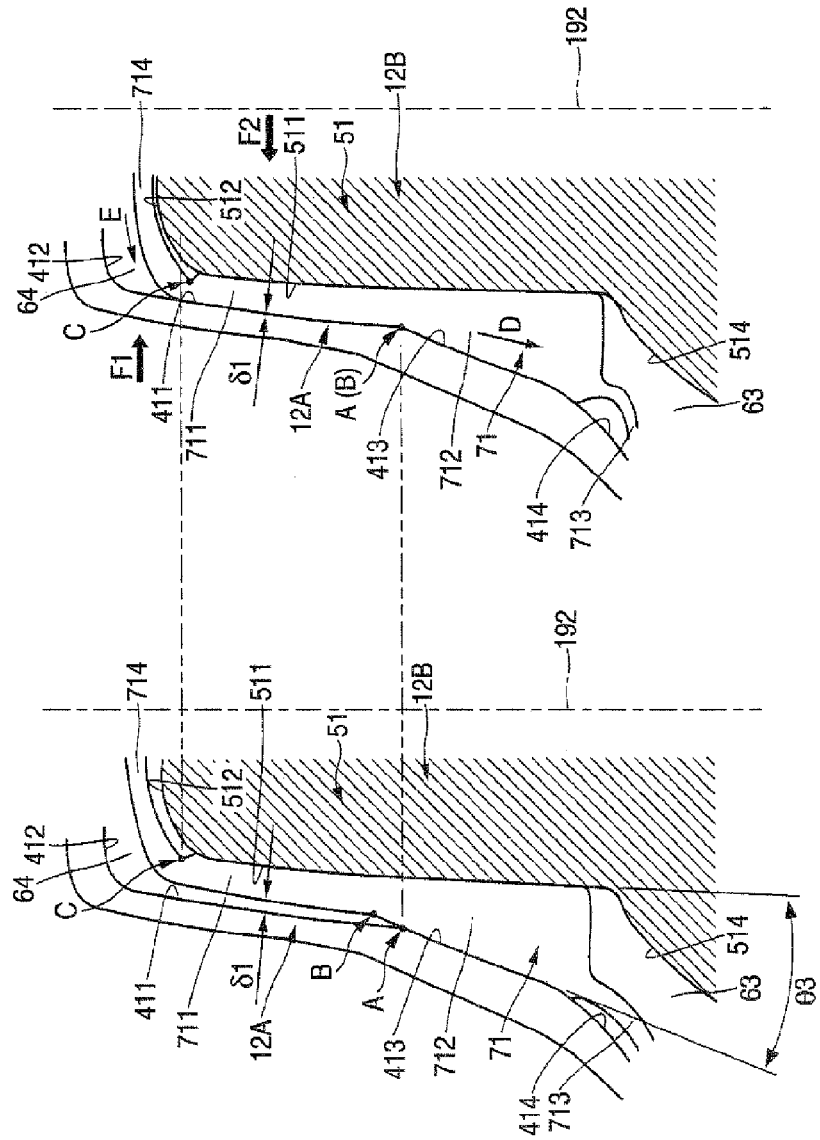
FIGS. 6A and 6B illustrate sectional views enlarging V portion of FIG. 3B.
Figure 7:
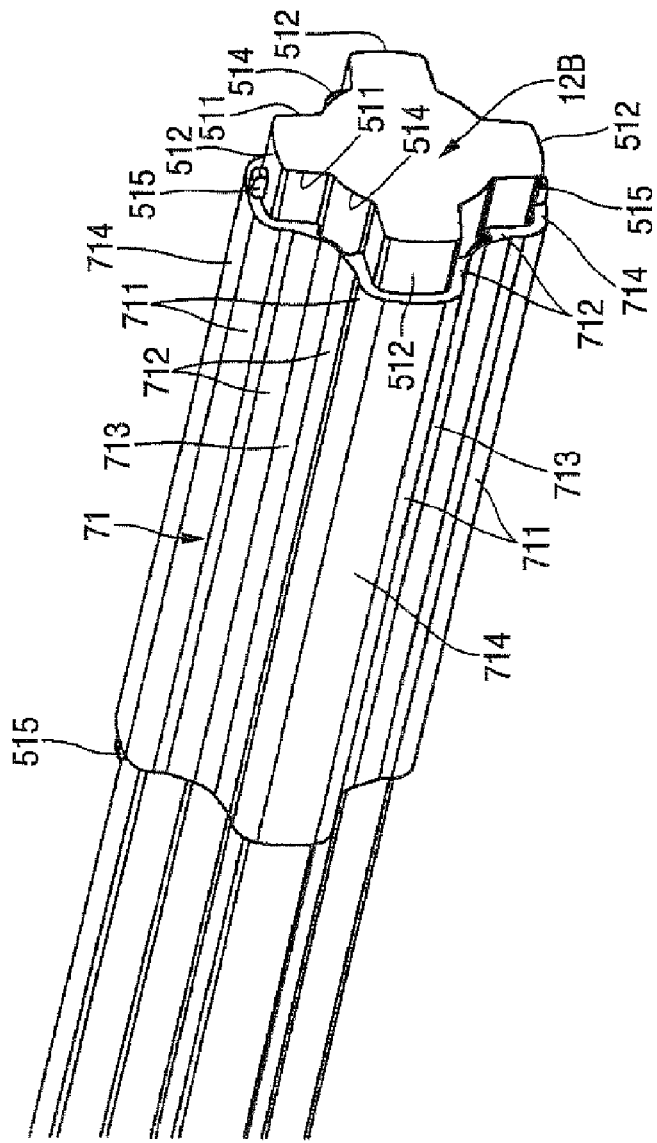
FIG. 7 is a perspective view showing a state of attaching the sleeve to the male shaft of Embodiment 1 before outwardly fitting the female shaft.

FIGS. 6A and 6B illustrate sectional views enlarging V portion of FIG. 3B. FIG. 6A shows a state in which a torque is not loaded between the male shaft and the female shaft. FIG. 6B shows a state of loading the torque between the male shaft and the female shaft. FIG. 7 is a perspective view showing a state of attaching the sleeve to the male shaft of Embodiment 1 and before outwardly fitting the female shaft.

As shown by FIG. 1 and FIG. 2, a steering apparatus having the telescopic shaft of Embodiment 1 of the invention includes a steering shaft 12 capable of mounting a steering wheel 11 on a rear side of a vehicle body (right sides of FIG. 1, FIG. 2), a steering column 13 inserted with the steering shaft 12, an assist apparatus (steering auxiliary portion) 20 for applying an auxiliary torque to the steering shaft 12, and a steering gear 30 connected to a front side of the vehicle body of the steering shaft 12 (left sides of FIG. 1, FIG. 2) by way of a rack/pinion mechanism, not illustrated.

The steering shaft 12 is constituted by an outer shaft (hereinafter, referred to as male shaft) 12A and an inner shaft (hereinafter, referred to as male shaft) 12B to be able to transmit a rotational torque and relatively displaceably in an axial direction.

That is, as shown by FIG. 2 to FIG. 5, a plurality of axial projected streaks are formed at an outer periphery on a rear side of the vehicle body of the male shaft 12B, a plurality of axial grooves are formed at an inner periphery on a front side of the vehicle body of the main shaft 12A at positions of phases the same as those of the axial projected streaks, outwardly fitted to the axial projected streaks of the male shaft 12B with a predetermined gap therebetween, and engaged therewith to be able to transmit the rotational torque and relatively displaceably in the axial direction. Therefore, in collision, engaging portions of the female shaft 12A and the male shaft 12B are slid relative to each other to be able to contract a total length thereof.

Further, the steering column 13 in a cylindrical shape inserted with the steering shaft 12 is telescopically movably combined with the outer column 13A and the inner column 13B to constitute a so-to-speak collapsible structure in which when an impact is applied in the axial direction in collision, a total length is contracted while absorbing an energy by the impact.

Further, an end portion on a front side of the vehicle body of the inner column 13B is press-fitted to an end portion on a rear side of the vehicle body of a gear housing 21 to be fixed thereby. Further, an end portion on a front side of the vehicle body of the male shaft 12B is passed to an inner side of the gear housing 21 to be coupled to an end portion on a rear side of the vehicle body of an input shaft 22 of an assist apparatus 20.

That is, a front side of the vehicle body of the male shaft 12B (left side of FIG. 2) is formed with a large diameter shaft portion 121B, a small diameter shaft portion 122B is formed on a front side of the vehicle body of the large diameter shaft portion 121B. The small diameter shaft portion 122B is press-fitted to be coupled with an inner diameter hole 221 formed on a rear side (right side of FIG. 2) of the vehicle body of the input shaft 22 of the assist apparatus 20 to fix positions of the input shaft 22 and the male shaft 12B in an axial direction.

A middle portion of the steering column 13 is supported by a portion of a vehicle body 18 such as a lower face of a dashboard or the like by a support bracket 14. Further, a locking portion, not illustrated, is provided between a support bracket 14 and the vehicle body 18, when an impact is applied to the support bracket 14 in a direction of being directed to the front side of the vehicle body, the support bracket 14 is detached from the locking portion to move to the front side of the vehicle body.

Further, also an upper end portion of the gear housing 21 is supported by a portion of the vehicle body 18. Further, in the case of the embodiment, by providing a tilt mechanism and a telescopic mechanism, a position in a front and rear direction of the vehicle body and a height position of the steering wheel 11 are made to be able to he adjusted. The tilt mechanism and the telescopic mechanism are well known in a background art, and are not characteristic portions of the invention, and therefore, detailed explanations thereof will be omitted.

An output shaft 23 projected from an end face on a front side of the vehicle body of the gear housing 21 is connected to a female intermediate shaft 16A of an intermediate shaft 16 by way of a universal joint 15. Further, an input shaft 31 of the steering gear 30 is connected to a front end portion of a male intermediate shaft 16B of the intermediate shaft 16 by way of other universal joint 17. The female intermediate shaft 16A is coupled with the male intermediate shaft 16B relatively displaceably in the axial direction and capable of transmitting a rotational torque. A pinion, not illustrated, is formed at a front end portion of the input shaft 31. Further, a rack, not illustrated, is brought in mesh with the pinion, and rotation of the steering wheel 11 moves a tie rod 32 to steer a wheel, not illustrated.

As shown by FIG. 2, in the gear housing 21 of the assist apparatus 20, the input shaft 22 and the output shaft 23 are axially supported rotatably by bearings 29A, 29B, 29C on the same axis line, and the input shaft 22 and the output shaft 23 are connected by a torsion bar 24. The output shaft 23 is attached with a worm wheel 25 and a worm 27 is brought in mesh with the worm wheel 25. A case 261 of an electric motor 26 is fixed to the gear housing 21 and the worm 27 is coupled to a rotating shaft, not illustrated, of the electric motor 26.

Further, a surrounding of a middle portion of the input shaft 22 is provided with a torque sensor 28 for detecting twist of the torsion bar 24. A direction and a magnitude of a torque applied from the steering wheel 11 to the steering shaft 12 are detected by the torque sensor 28. In accordance with a detecting signal thereof, the electric motor 26 is driven, and the auxiliary torque having a predetermined magnitude in a predetermined direction is generated at the output shaft 23 by way of a speed reducing mechanism comprising the worm 27 and the worm wheel 25.

As shown by FIG. 2 to FIG. 5, there is shown an example for applying the telescopic shaft of Embodiment 1 of the invention to a portion of connecting the female shaft 12A and the male shaft 12B of the steering shaft 12. A front side (left side of FIG. 2) of the vehicle body of the female shaft 12A is outwardly fitted to be connected to a rear side (right side of FIG. 2) of the vehicle body of the male shaft 12B.

As shown by FIG. 4, the female shaft 12A is formed by a shape of a hollow cylinder, and an inner periphery thereof is formed with 4 pieces of axial grooves 41, 41, 41, 41, radially from an axis center 19 of the female shaft 12A over a total length of an elongating and contracting stroke at equal intervals (90 degrees intervals). The respective axial grooves 41 include outer side faces 411, 411 formed by an angle $\theta 1$ relative to a center line horizontal in a left and right direction of FIG. 3 and FIG. 4 and a center line 192 vertical in an up and down direction in FIG. 3 and FIG. 4.

Therefore, an interval between outer side faces 411, 411 constituting the one axial groove 41 is narrowed toward an outer side in a radial direction. Further, outer ends in the radial direction of the outer side faces 411, 411 are smoothly connected to a bottom face 412 in a shape of a convex circular arc to the outer side, and sections of the respective axial grooves 41 orthogonal to the axis are formed substantially by a channel-like shape by the outer side faces 411, 411 and the bottom face 412.

Further, inner side faces 413, 413 are formed to extend to an inner side in the radial direction from inner ends in the radial direction of the outer side face 411, 411 by an angle $\theta 2$ larger than the angle $\theta 1$. Further, inner ends in the radial direction of the inner side faces 413, 413 are smoothly connected to inner ends in the radial direction of the inner side faces 413, 413 contiguous thereto by connecting faces 414 in a shape of a convex circular arc to the inner side.

Further, as shown by FIG. 4, a rear side of the vehicle body of the male shaft 12B is formed by a shape of a solid column and by a diameter more or less larger than that of a middle portion thereof. Further, an outer periphery of the large diameter portion on a rear side of the vehicle body of the male shaft 12B is formed with 4 pieces of axial projected streaks 51, 51, 51, 51 over a total length in the axial direction of the outer periphery of the large diameter portion radially from the axis center 19 at positions of phases the same as those of the axial grooves 41 at equal intervals (90 degrees intervals).

The axial projected streak 51 includes side faces 511, 511 in parallel with the outer side faces 411, 411 of the axial grooves. The side faces 511 of the axial projected streaks 51 may substantially be in parallel with the outer side faces 411 of the axial grooves 41. Therefore, an interval between the side face 511 and the side face 511 constituting the one axial projected streak 51 is narrowed toward the outer side in the radial direction.

Further, outer ends in the radial direction of the side faces 511, 511 are connected to top faces 512 in a shape of a convex circular arc toward the outer side, and sections orthogonal to the axis of the respective axial projected streaks 51 are formed substantially by a channel-like shape by the side faces 511, 511 and the top faces 512. Inner ends in the radial direction of the side faces 511, 511 and inner ends in the radial direction of the side faces 511, 511 contiguous thereto are connected by connecting faces 514 by a shape of a convex circular arc to the outer side.

Therefore, parallel gaps 61 having a constant interval are formed between the side faces 511, 511 of the axial projected streaks 51 of the male shaft 12B and the outer side faces 411, 411 of the axial grooves 41 of the male shaft 12A. Further, inclined gaps 62 narrowing an interval to the outer side in the radial direction are formed between the side faces 511, 511 of the axial projected streaks 51 of the male shaft 12B and the inner side faces 413, 413 of the axial grooves 41 of the female shaft 12A and minimum gap portions of outer ends in the radial direction of the inclined gaps 62 are continuously connected to the parallel gaps 61.

As shown by FIG. 3 and FIG. 5, a sleeve 71 in a ring-like shape formed by an elastic member is inserted into the gap between the outer periphery of the male shaft 12B and the female shaft 12A. The sleeve 71 is formed in a ring-like shape by arranging partial sleeves each constituted by three elements of a parallel sleeve portion 711, an inclined sleeve portion 712, an urge sleeve portion 713 in line symmetry relative to the center lines 191, 192 and connecting both ends thereof to the partial sleeves contiguous to each other.

The parallel sleeve portion 711 is inserted into the parallel gap 61, the inclined sleeve portion 712 is inserted to the inclined gap 62, and the urge sleeve portion 713 is inserted to an inner side circular arc shape gap 63. Further, outer ends in the radial direction of the parallel sleeve portions 711 are formed with connecting sleeve portions 714 in a circular arc shape, and the connecting sleeve portions 714 are inserted to outer side circular arc shape gaps 64 between the bottom faces 712 in the circular arc shape and the top faces 512 in the circular arc shape to be connected to outer ends in the radial direction of the parallel sleeve portions 711 contiguous thereto.

The urge sleeve portion 713 and the connecting sleeve portion 714 are formed by wall thicknesses thinner than those of the parallel sleeve portion 711 and the inclined sleeve portion 712. Therefore, when as shown by FIG. 5, the sleeve 71 is outwardly fitted to the outer periphery of the male shaft 12B the urge sleeve portion 713 and the connecting sleeve portion 714 are elastically expanded in diameters thereof to the outer side in the radial direction and the sleeve 71 can easily be fitted outwardly to the outer periphery of the male shaft 12B.

Next, as shown by FIG. 5 and FIG. 7, projected portions 515, 515 are formed by calking to project to the outer side in the radial direction at both end portions in the axial direction of the sleeve 71 at 2 portions of the top faces 512, 512 (2 portions in the up and down direction of FIG. 5) having phases different from each other by 180 degrees at the outer periphery of the male shaft 12B. The projected portions 515, 515 are brought into contact with both end portions in the axial direction of the sleeve 71 to fix such that the sleeve 71 is not moved in the axial direction relative to the male shaft 12B.

As other example, the sleeve 71 may be fixed to the female shaft 12A to be unable to move in the axial direction.

Successively, as shown by FIGS. 3A and 3B, the female shaft 12A is outwardly fitted to the male shaft 12B outwardly fitted with the sleeve 71. Then, the outer periphery of the inclined sleeve portion 712 is provided with a predetermined fastening margin relative to the inner side face 413 of the female shaft 12A, and therefore, when the female shaft 12A is outwardly fitted to the male shaft 12B against the fastening margin, the inclined sleeve portion 712 is moved in an arrow mark D direction of FIG. 6B.

When the inclined sleeve portion 712 is moved in the arrow mark D direction, as shown by FIG. 6B, the urge sleeve portion 713 formed by a thin wall is elastically deformed by being folded to bend in a projected shape to a side of the axis center 19 by being pressed by the inclined sleeve portion 712.

The wall thickness of the urge sleeve portion 713 is formed to be thin-walled more than an interval of the inner side circular arc shape gap 63 between the connecting face 514 in the circular arc shape and the connecting face 414 in the circular arc shape and is provided with a gap always between the connecting face 514 and the connecting face 414. Therefore, the urge sleeve portion 713 is elastically deformed by being folded to bend in the projected shape to the side of the axis center 19 to smoothly move the inclined sleeve portion 712 in the arrow mark D direction. The gap of either of the gap between the urge sleeve portion 713 and the connecting face 714, or the gap between the urge sleeve portion 713 and the connecting face 414 may be dispensed with and only the other thereof may be provided with the gap.

Further, the connecting sleeve portion 714 formed by the thin wall thickness is moved in an arrow mark E direction by being pulled by the inclined sleeve portion 712, and is elastically deformed by being fold to bend to the side of the axis center 19. The wall thickness of the connecting sleeve portion 714 is formed to be a wall thickness thinner than the interval of the outer side circular arc shape gap 64 between the bottom face 412 in the circular arc shape and the top face 512 in the circular arc shape to always provide the gap between the bottom face 412 and the top face 512. Therefore, the connecting sleeve portion 714 is elastically deformed by being bent to the side of the axis center 19, and the inclined sleeve portion 712 is moved smoothly in the arrow mark D direction. The gap of either of the gap between the connecting sleeve portion 714 and the bottom face 412, or the gap between the connecting sleeve portion 714 and the top face 512 may be dispensed with and only other thereof may be provided with the gap.

Since the urge sleeve portion 713 is elastically deformed, by an elastic force of the urge sleeve portion 713, the inclined sleeve portion 712 is operated with an urge force in a direction of pressing the inclined sleeve portion 712 to the inclined gap 62. That is, in FIG. 6B, the inclined sleeve portion 712 is pressed from a maximum gap portion on the lower side of the inclined gap 62 to a minimum gap portion on the upper side, and therefore, there is not backlash between the male shaft 12B and the female shaft 12A, further, a predetermined preload is applied between the male shaft 12B and the female shaft 12A.

When the position in the front and rear direction of the vehicle body of the steering wheel 11 is adjusted under the state, the outer column 13A is telescopically moved relative to the inner column 13B, and the female shaft 12A is slid in the axial direction relative to the male shaft 12B.

In sliding in the axial direction of the female shaft 12A, the outer periphery of the inclined sleeve portion 712 is slid while always being brought into contact with the inner side face 413 of the female shaft 12A. Therefore, the outer periphery of the inclined sleeve portion 712 is gradually worn by a friction force in sliding, however, by the elastic force of the urge sleeve portion 713, the inclined sleeve portion 712 is always operated with the urge force in the direction of pressing the inclined sleeve portion 712 to the inclined gap 62, and therefore, the preload is not reduced.

That is, the urge sleeve portion 713 is interposed between the connecting face 514 and the connecting face 414 to always provide the gap, and therefore, is not worn. Therefore, even when the outer periphery of the inclined sleeve portion 712 is worn, the inclined sleeve portion 712 is further pressed by the elastic force of the urge sleeve portion 713 from the maximum gap portion on the lower side of the inclined gap 62 to the minimum gap portion on the upper side by an amount of wearing the outer periphery of the inclined sleeve portion 712. Therefore, the inclined sleeve portion 712 is always operated with a predetermined urge force.

FIG. 6A shows a state in which the rotational torque is not loaded between the male shaft 12B and the female shaft 12A, FIG. 6B shows a state of loading the rotational torque between the male shaft 12B and the female shaft 12A. When a wheel (not illustrated) is steered by rotating the steering wheel 11 in the clockwise direction in view from FIG. 6B, the rotational torque is operated between the female shaft 12A and the male shaft 12B, as shown by FIG. 6B, a load F1 is operated to the female shaft 12A, and the male shaft 12B is operated with a load F2 having a magnitude the same as that of the load F1 and a direction reverse thereto.

Then, as shown by FIG. 6B, the inclined sleeve portion 712 is moved in the arrow mark D direction by the loads F1, F2. The connecting sleeve portion 714 is moved in the arrow mark E direction by being pulled by the inclined sleeve portion 712 to move point C of FIG. 6A to a position of point C of FIG. 6B and is elastically deformed by being folded to bend to the side of the axis center 19. Further, the urge sleeve portion 713 is elastically deformed by being folded to bend in the projected shape to the side of the axis center 19.

By elastically deforming the urge sleeve portion 713, at the inclined sleeve portion 712, a state of operating a constant urge force in a direction of pressing the inclined sleeve portion 712 to the inclined gap 62 is maintained. Therefore, there is not backlash between the male shaft 12B and the female shaft 12A, further, a state of applying a predetermined preload between the male shaft 12B and the female shaft 12A is maintained.

When the inclined sleeve portion 712 is moved in the arrow mark D direction by the loads F1, F2 until point B of the inner end in the radial direction of the outer periphery of the parallel sleeve portion 711 coincides with point A of the inner end in the radial direction of the outer side face 411, the outer periphery of the parallel sleeve portion 711 and the outer side face 411 of the female shaft 12A are brought into close contact with each other. Therefore, a gap δ1 between the outer periphery of the parallel sleeve portion 711 and the outer side face 411 of the female shaft 12A is eliminated, and the rotational torque is transmitted from the female shaft 12A to the male shaft 12B between the outer periphery of the parallel sleeve portion 711 and the outer side face 411 of the female shaft 12A.

At this occasion, the intervals of the parallel gaps 61 and the inclined gaps 62 disposed at positions in line symmetry by interposing the center line 192 become larger than the parallel gap 61 and the inclined gap 62 shown in FIG. 6B. However, the state of operating the urge force in the direction of pressing the inclined sleeve portion 712 to the inclined gap 62 is maintained by the elastic force of the urge sleeve portion 713 connected to the inclined sleeve portion 712 disposed at a position in line symmetry therewith, and therefore, a state of bringing the inclined gap 62 and the inclined sleeve portion 712 disposed at other positions in line symmetry into close contact with each other is maintained.

As a material of the sleeve 71, it is preferable to form the sleeve 71 by natural rubber, synthetic rubber, or a mixture of natural rubber and synthetic rubber. Further, as the material of the sleeve 71, it is preferable to form the sleeve 71 by a material of natural rubber, synthetic rubber, or a mixture of natural rubber and synthetic rubber including a solid lubricant of at least anyone of molybdenum disulfide, graphite, a fluorine compound and the sleeve 71 can be formed by injection molding.

As the material of the sleeve 71, it is preferable to form on the basis of a polymer material of at least any one of polytetrafluoroethylene, phenolic resin, acetal resin, polyimide resin, polyamideimide resin, polyether sulfonic resin, polyphenylene sulfide resin including a solid lubricant of at least any one of molybdenum disulfide, graphite, a fluorine compound, and the sleeve 71 can be formed by injection molding.

As the material of the sleeve 71, it is preferable to form the sleeve 71 by a material on the basis of a polymer material of at least any one of polytetrafluoroethylene, phenolic resin, acetal resin, polyimide resin, polyamideimide resin, polyether sulfonic resin, polyphenylene sulfide resin including at least any one of carbon fiber, carbon beads, and the sleeve 71 can be formed by injection molding.

As the material of the sleeve 71, the sleeve 71 can also be formed by spring steel. Further, as materials of the female shaft 12A and the male shaft 12B, the female shaft 12A and the female shaft 12B can be formed by any one of steel including 0.04% or more of carbon, an aluminum alloy, a polymer material. When the rotational torque burdened on the female shaft 12A and the male shaft 12B is small, the female shaft 12A and the male shaft 12B may be formed by a polymer material.

As a method of forming the female shaft 12A and the male shaft 12B, the female shaft 12A and the male shaft 12B may be formed by selecting anyone method of cold forging, hot forging, pressing, swaging, drawing, extruding, machining.

After outwardly fitting the sleeve 71 to the outer periphery of the male shaft 12B, when the inner periphery of the female shaft in the shape of the circular tube is outwardly fitted to the outer periphery of the sleeve 71, and the outer periphery of the female shaft is pressed by a press to contract a diameter, the telescopic shaft having very small backlash can be formed.

Figures 8A, 8B:
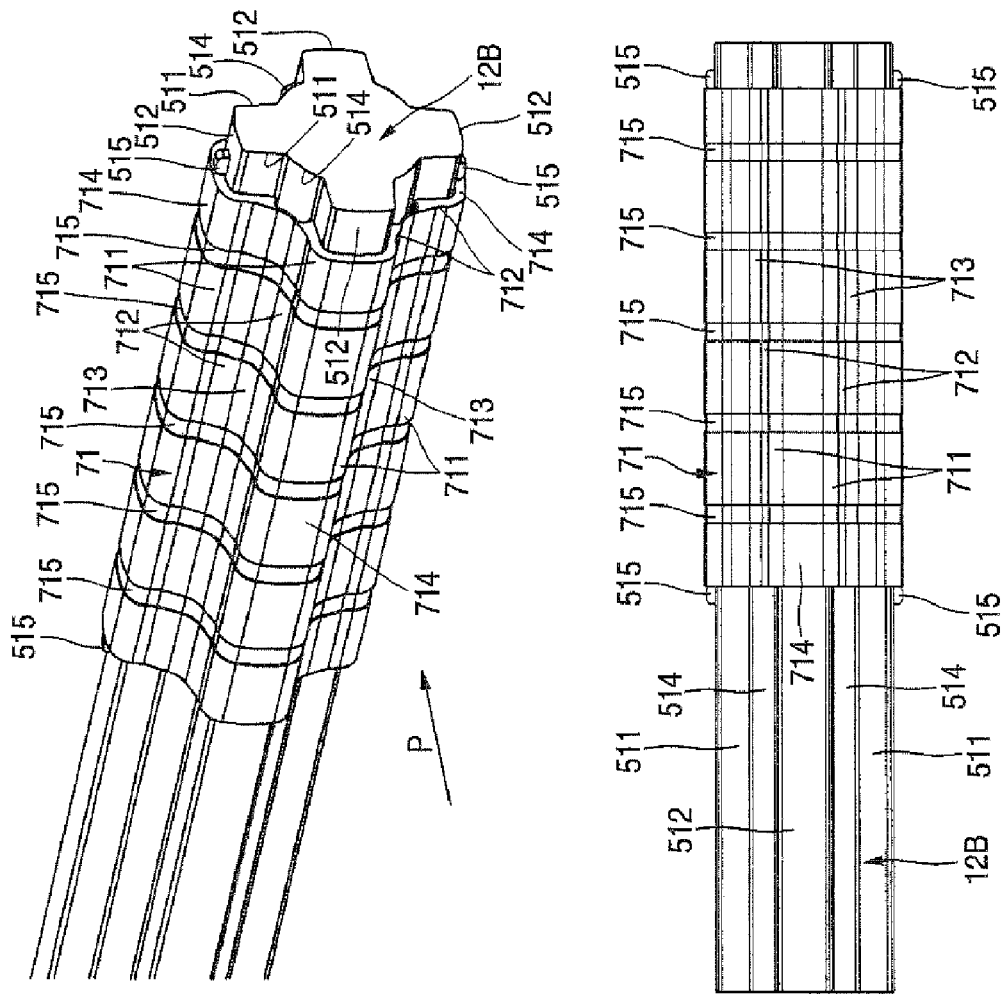
FIGS. 8A and 8B show a modified example of FIG. 7.

FIGS. 8A and 8B show modified examples of the sleeve of FIG. 7, FIG. 8A is a perspective view showing a male shaft attached with a sleeve formed with a recess portion for storing a lubricant at an outer periphery thereof. FIG. 8B is a front view viewing FIG. 8A from P arrow mark direction. As shown by FIGS. 8A and 8B, the outer periphery of the sleeve 71 is formed with a plurality of recess portions 715 for storing a lubricant at the outer periphery of the sleeve 71 in a ring-like shape over an entire periphery thereof and the plurality thereof are arranged in an axial direction.

When the plurality of recess portions 715 for storing a lubricant are formed, the lubricant is stably supplied to a sliding face of the outer periphery of the sleeve 71 over a long period of time, and therefore, a sliding resistance is maintained to be small over a long period of time, which is preferable. The plurality of recess portions 715 for storing a lubricant may be formed at an inner periphery of the female shaft 12A. Further, when the sleeve 71 is fixed to the female shaft 12A to be unable to move in the axial direction, the plurality of recess portions for storing the lubricant may be formed at the inner periphery of the sleeve 71, or the outer periphery of the male shaft 12B.

The plurality of recess portions 715 for storing the lubricant may be formed at the outer periphery of the sleeve 71 spirally by inclining the recess portions 715 relative to the axis center of the male shaft 12B over the entire periphery. Further, a pair of recess portions inclined spirally relative to an axis center of the male shaft 12B and intersected with each other may be formed at the outer periphery of the sleeve 71 over the entire periphery. Further, as a shape of the recess portion 715 for storing the lubricant, a plurality of recess portions in an island-like shape of a circular shape, an elliptical shape, a polygonal shape or the like may be formed at the sliding face of the outer periphery of the sleeve 71 or the like.

As shown by FIG. 4 and FIG. 6A, a wedge angle $\theta 3$ ($\theta 3=\theta 2-\theta 1$) of the inclined sleeve portion 712 is set to be larger than a friction angle (5.7 degrees through 23 degrees) of the inclined sleeve portion 712 to prevent the inclined sleeve portion 712 from being self-locked at inside of the inclined gap 62. The wedge angle $\theta 3$ of the inclined sleeve portion 712 is actually an angle between the side face 511 of the axial projected streak 51 and the inner side face 713 of the axial groove 41 as shown by FIG. 6A. However, the side face 511 of the axial projected streak 51 and the outer side face 411 of the axial groove 41 are in parallel with each other, and therefore, even when the angle is regarded as $\theta 3=\theta 2-\theta 1$, the angle remains unchanged substantially. Although the outer side face 511 of the axial groove 41 is formed to be inclined by the angle $\theta 1$ relative to the center line 192, the outer side face 411 may he formed in parallel with the center line 192. That is, the wedge angle $\theta 3$ is a relative angle between the side face 511 of the axial projected streak 51 and the inner side face 413 of the axial groove 41.

FIGS. 9A to 9E illustrate enlarged sectional views showing various examples of the inclined gap and the parallel gap.

FIG. 9A shows the inclined gap 62 and the parallel gap 61 of Embodiment 1 shown in FIG. 3 through FIG. 7. FIG. 9B shows a modified example of Embodiment 1.

That is, in FIG. 9B, the axial groove 41 of the female shaft 12A is formed with one kind of the side face 415 formed by the angle $\theta 1$ relative to the center line 192. Further, the axial projected streak 51 of the male shaft 12B is formed with two kinds of side faces of an outer side face 516 in parallel with the side face 415 of the axial groove 41, and an inner side face 517 formed by being extended from an inner end in a radial direction of the outer side face 516 to an inner side in the radial direction by an angle in a direction reverse to that of the angle $\theta 1$ (inclined in a direction of being remote from the center line 192 to the outer side in the radial direction).

Therefore, a parallel gap having a constant interval is formed between the outer side face 516 of the axial projected streak 51 and the side face 415 of the axial groove 41. Further, an inclined gap narrowing an interval thereof to the outer side in the radial direction is formed between the inner side face 517 of the axial projected streak 51 and the side face 415 of the axial groove 41, and a minimum gap portion at an outer end in the radial direction of the inclined gap is continuously connected to the parallel gap.

The parallel sleeve portion 711 is inserted to the parallel gap, the inclined sleeve portion 712 is inserted to the inclined gap, and the urge sleeve portion 713 is inserted to the inner side circular arc shape gap between the connecting face 514 in the circular arc shape and the connecting face 414 in the circular arc shape. Further, the outer end in the radial direction of the parallel sleeve portion 711 is formed with the connecting sleeve portion 714, the connecting sleeve portion 714 is inserted to the outer side circular arc shape gap between the bottom face 412 in the circular arc shape and the top face 512 in the circular arc shape, and connected to the outer end in the radial direction of the parallel sleeve portion 711 contiguous thereto.

The inclined sleeve portions 712 are operated with urge forces F3, F3 in directions of pressing the inclined sleeve portions 712 to the inclined gaps by the elastic forces of the urge sleeve portions 713. That is, in FIG. 9B, the inclined sleeve portions 712 are pressed from the maximum gap portions on the lower side of the inclined gaps to the minimum gap portions on the upper side by the urge forces F3, F3. Therefore, there is not backlash between the male shaft 12B and the female shaft 12A, further, a predetermined preload is applied between the male shaft 12B and the female shaft 12A.

FIG. 9C is a modified example of FIG. 9B. That is, in FIG. 9C, the axial groove 41 of the female shaft 12A is formed with one kind of the side face 415 formed by the angle $\theta 1$ relative to the center line 192. Further, the axial projected streak 51 of the male shaft 123 is formed with two kinds of side faces of the outer side face 516 in parallel with the side face 415 of the axial groove 41, and an inner side face 518 formed by being extended from the inner end in the radial direction of the outer side face 516 to the inner side in the radial direction by an angle larger than the angle $\theta 1$.

Therefore, the parallel gap having the constant interval is formed between the outer side face 516 of the axial projected streak 51 and the side face 415 of the axial groove 41. Further, the inclined gap widening an interval to the outer side in the radial direction is formed between the inner side face 518 of the axial projected streak 51 and the side face 415 of the axial groove 41, and a maximum gap portion of an outer end in the radial direction of the inclined gap is continuously connected to the parallel gap.

The parallel sleeve portion 711 is inserted to the parallel gap, the inclined sleeve portion 712 is inserted to the inclined gap, the urge sleeve portion 713 is inserted to the inner side circular arc shape gap between the connecting face 514 in the circular arc shape and the connecting face 414 in the circular arc shape. Further, an outer end in the radial direction of the parallel sleeve portion 711 is formed with the connecting sleeve portion 714, the connecting sleeve portion 714 is inserted to the outer side circular arc shape gap between the bottom face 412 in the circular arc shape and the top face 512 in the circular arc shape, and is connected to the outer end in the radial direction of the parallel sleeve portion 711 contiguous thereto.

An urge force F4 is generated by always pressing the connecting sleeve portion 714 which is thin-walled and bent in the circular arc shape to the bottom face 412 of the axial groove 41, and the inclined sleeve portions 712 are operated with urge forces F4, F4 in directions of pressing the inclined sleeve portions 712 to the inclined gaps by way of the parallel sleeve portions 711. That is, in FIG. 9C, the inclined sleeve portions 712 are pressed from the maximum gap portions on the upper side of the inclined gaps to the minimum gap portions on the lower side by the urge forces F4, F4. Therefore, there is not backlash between the male shaft 12B and the female shaft 12A, further, a predetermined preload is applied between the male shaft 12B and the female shaft 12A.

FIG. 9D shows a modified example of FIG. 9C. That is, in FIG. 9D, the axial groove 41 of the female shaft 12A is formed with two kinds of side faces of an outer side face 416 formed by the angle $\theta 1$ relative to the center line 192, and an inner side face 417 formed by being extended from an inner end in the radial direction of the outer side face to the inner side in the radial direction in parallel with the center lien 192. Further, the axial projected streak 51 of the female shaft 12B is formed with two kinds of side faces of the outer side face 516 in parallel with the outer side face 416 of the axial groove 41, and the inner side face 518 formed by being extended from the inner end in the axial direction of the outer side face 516 to the inner side in the radial direction by the angle larger than the angle θ1.

Therefore, the parallel gap having the constant interval is formed between the outer side face 516 of the axial projected streak 51 and the outer side face 516 of the axial groove 41. Further, an inclined gap widening an interval thereof to the outer side in the radial direction is formed between the inner side face 518 of the axial projected streak 51 and the inner side face 417 of the axial groove 41, and a maximum gap portion at an outer end in the radial direction of the inclined gap is continuously connected to the parallel gap.

The parallel sleeve portion 711 is inserted to the parallel gap, the inclined sleeve portion 712 is inserted to the inclined gap, the urge sleeve portion 713 is inserted to the inner side circular arc shape gap between the connecting face 514 in the circular arc shape and the connecting face 514 in the circular arc shape. Further, an outer end in the radial direction of the parallel sleeve portion 711 is formed with the connecting sleeve portion 714, the connecting sleeve portion 714 is inserted to the outer side circular arc shape gap between the bottom face 412 in the circular arc shape and the top face 512 in the circular arc shape and is connected to the outer end in the radial direction of the parallel sleeve portion 711 contiguous thereto.

The urge force F4 is generated by always pressing the connecting sleeve portion 714 which is thin-walled and bent in the circular arc shape to the bottom face 412 of the axial groove 41, and the inclined sleeve portions 712 are operated with the urge forces F4, F4 in directions of pressing the inclined sleeve portions 712 to the inclined gaps by way of the parallel sleeve portions 711. That is, in FIG. 9D, the inclined sleeve portions 712 are pressed from the maximum gap portions on the upper side on the inclined gaps to the minimum gap portions on the lower side by the urge forces F4, F4. That is, there is not backlash between the male shaft 12B and the female shaft 12A, further, a predetermined preload is applied between the male shaft 12B and the female shaft 12A.

FIG. 9E is a modified example of FIG. 9D. That is, in FIG. 9E, the axial groove 41 of the female shaft 12A is formed with two kinds of the side faces of the outer side face 416 formed by the angle θ1 relative to the center line 192 and the inner side face 417 formed by being extended to the inner side in the radial direction in parallel with the center line 192. Further, the axial projected streak 51 of the male shaft 12B is formed with one kind of a side face 519 in parallel with the center line 192.

Therefore, an inclined gap narrowing an interval thereof to the outer side in the radial direction is formed between the side face 519 of the axial projected streak 51 and the outer side face 416 of the axial groove 41. Further, a parallel gap having a constant interval is formed between the side face 519 of the axial projected streak 51 and the inner side face 417 of the axial groove 41, and a maximum gap portion of an inner end in the radial direction of the inclined gap is continuously connected to the parallel gap.

The parallel sleeve portion 711 is inserted to the parallel gap, the inclined sleeve portion 712 is inserted to the inclined gap, the urge sleeve portion 713 is inserted to the inner side circular arc shape gap between the connecting face 514 in the circular arc shape and the connecting face 414 in the circular arc shape. Further, the outer end in the radial direction of the inclined sleeve portion 712 is formed with the connecting sleeve portion 714, the connecting sleeve portion 714 is inserted to the outer side circular arc shape gap between the bottom face 412 in the circular arc shape and the top face 512 in the circular arc shape and is connected to the outer end in the radial direction of the inclined sleeve portion 712 contiguous thereto.

The inclined sleeve portions 712 are operated with urge forces F5, F5 in directions of pressing the inclined sleeve portions 712 to the inclined gaps by way of the parallel sleeve portions 711 by elastic forces of the urge sleeve portions 713. That is, in FIG. 9E, the inclined sleeve portions 712 are pressed from the maximum gap portions on the lower side of the inclined gaps to the minimum gap portions on the upper side by the urge forces F5, F5. Therefore, there is not backlash between the male shaft 12B and the female shaft 12A, further, a predetermined preload is applied between the male shaft 12B and the female shaft 12A.

In FIGS. 9A to 9E, it is expressed as if there were gaps between the inclined sleeve portions 712 inserted to the inclined gap and the male shaft 12B and between the inclined sleeve portion 712 and the female shaft 12A. However, actually, the inclined sleeve portion 712 and the inclined gap are formed by being always brought into contact with each other.

Embodiment 2

Figure 10:
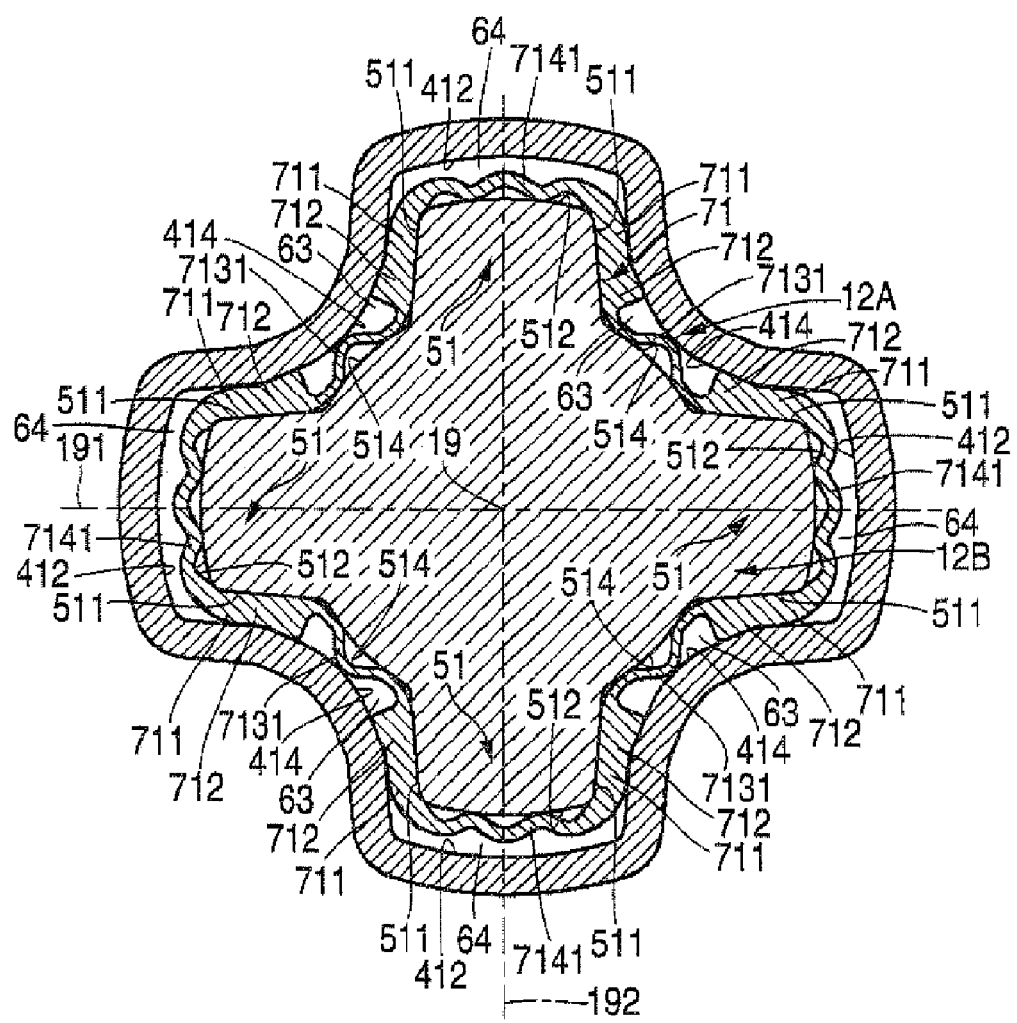
FIG. 10 shows a telescopic shaft of Embodiment 2 of the invention, corresponding to the enlarged sectional view taken along the line II-II of FIG. 2 constituting sections of the male shaft, the female shaft and the sleeve.

Next, Embodiment 2 of the invention will be explained. FIG. 10 shows a telescopic shaft of Embodiment 2 of the invention, and corresponds to the enlarged sectional view taken along a line II-II of FIG. 2 constituting sections of a male shaft, a female shaft and a sleeve. In the following explanation, an explanation will be given of only a constituent portion and operation which differ from those of Embodiment 1, the duplicated explanation thereof will be omitted. Further, an explanation will be given by attaching the same numerals to parts the same as those of Embodiment 1.

Embodiment 2 is a modified example of Embodiment 1, and an example in which an urge sleeve portion and a connecting sleeve portion are constituted by waveform shapes, a portion of the connecting sleeve portion is brought into contact with the outer periphery of the male shaft 12B, and a portion of the urge sleeve portion is brought into contact with the inner periphery of the female shaft 12A.

That is, in Embodiment 1, a wall thickness of the urge sleeve portion 713 is formed to be more thin-walled than the interval of the inner side circular arc shape gap 63 between the connecting face 514 in the circular arc shape and the connecting face 414 in the circular arc shape. Further, the urge sleeve portion 713 is always provided with the gap between connecting face 514 and the connecting face 414, and elastically deformed freely at inside of the inner side circular arc shape gap 63 to be able to always apply an urge force to the inclined sleeve portion 712.

Further, in Embodiment 1, a wall thickness of the connecting sleeve portion 714 is formed to be more thin-walled than the interval of the outer side circular arc shape gap 64 between the bottom face 412 in the circular arc shape and the top face 512 in the circular arc shape. Further, the connecting sleeve portion 714 is always provided with the gap between the bottom face 412 and the top face 512, and is elastically deformed freely at inside of the outer side circular arc shape gap 64 to smoothly move by following movement of the inclined sleeve portion 712.

In contrast thereto, according to Embodiment 2, a wall thickness of urge sleeve portion 7131 is more thin-walled than the interval of the inner side circular arc shape gap 63 between the connecting face 514 in the circular arc shape and the connecting face 414 in the circular arc shape to be formed by being bent to a waveform of one mountain. Further, an apex of the mountain of the waveform is always brought into contact with the connecting face 414 of the female shaft 12A. Further, both ends of an inner periphery of the urge sleeve portion 7131 are always brought into contact with the contact face 514 of the male shaft 12A, and a center portion of the inner periphery of the urge sleeve portion 7131 is always provided with the gap between the center portion and the connecting face 514 of the male shaft 12A.

Thereby, the urge sleeve portion 7131 is always pressed to the contact face 514 to generate an urge force and applies an urge force in a direction of expanding the interval of the inner side circular arc shape gap 63 between the male shaft 12B and the female shaft 12A. Therefore, the urge sleeve portion 7131 can elastically be deformed freely at inside of the inner side circular arc shape gap 63 to always provide an urge force to the inclined sleeve portion 712. As other example, in the urge sleeve portion 7131, an apex of a mountain of a waveform may always be brought into contact with the connecting face 514 of the male shaft 12B, and a gap may always be provided between the apex and the connecting face 414 of the female shaft 12A. Further, as still other example, the urge sleeve portion 7131 may always be brought into contact with both of the connecting face 514 of the male shaft 12B and the connecting face 414 of the female shaft 12A.

Further, a wall thickness of the connecting sleeve portion 7141 of Embodiment 2 is formed to be more thin-walled than that in Embodiment 1 and is formed to be bent into a waveform of two mountains. Further, apexes of the mountains in the waveform are always brought into contact with the top face 512 of the male shaft 12B and gaps are always provided between the apexes and the bottom face 412 of the female shaft 12A. Therefore, the connecting sleeve portion 7141 is elastically deformed freely at inside of the outer side circular arc shape gap 64 and the connecting sleeve portion 7141 can smoothly be moved by following the movement of the inclined sleeve portion 712.

Embodiment 3

Figure 11:
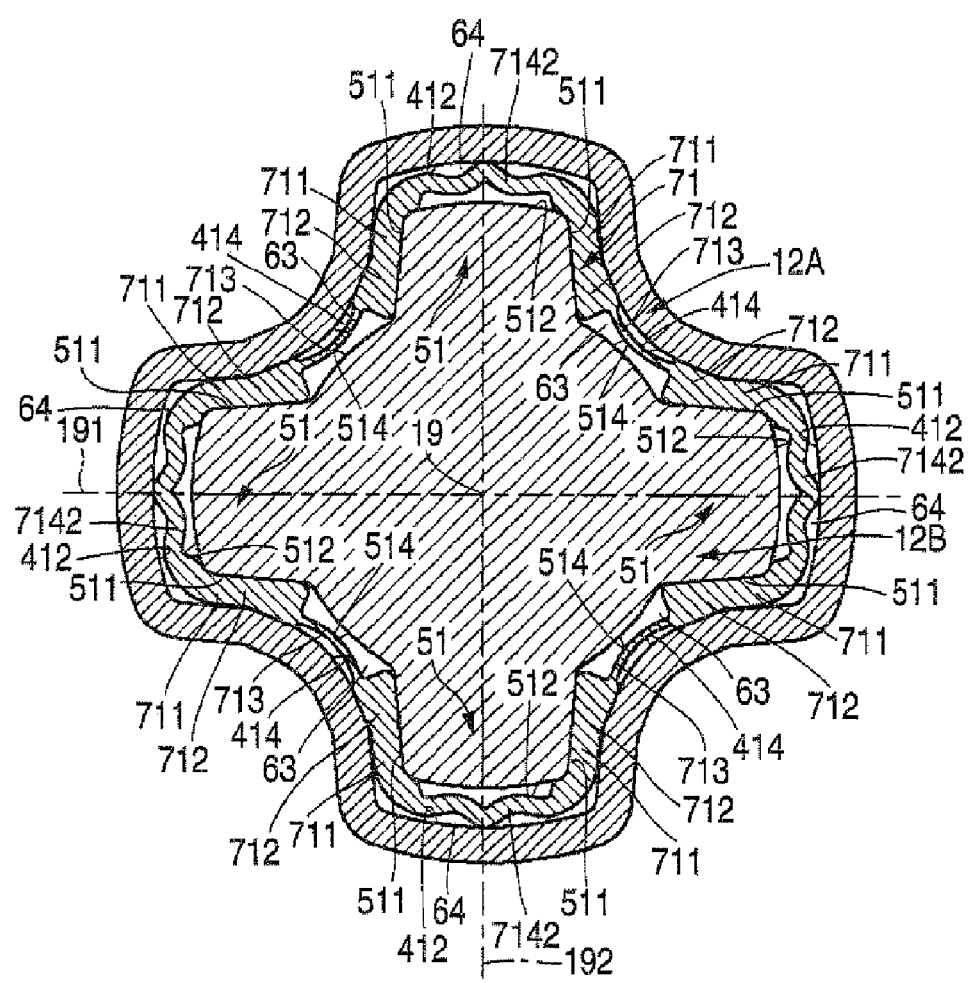
FIG. 11 shows a telescopic shaft of Embodiment 3 of the invention, corresponding to the enlarged sectional view taken along the line II-II of FIG. 2 constituting sections of the male shaft, the female shaft and the sleeve.

Next, Embodiment 3 of the invention will be explained. FIG. 11 shows a telescopic shaft of Embodiment 3 of the invention and corresponds to an enlarged sectional view taken along a line II-II of FIG. 2 constituting sections of a male shaft, a female shaft and a sleeve. In the following explanation, an explanation will be given of a structure portion and operation which differ from those of the above-described embodiments, a duplicated explanation thereof will be omitted. Further, an explanation will be given by attaching the same numerals to parts the same as those of above-described embodiments.

Embodiment 3 is a modified example of Embodiment 1 and is an example in which a connecting sleeve portion is constituted by a waveform shape, a portion of the connecting sleeve portion is brought into contact with the inner periphery of the female shaft 12A, and an urge sleeve portion is always provided with gaps between the sleeve portion and the inner periphery of the female shaft 12A and the outer periphery of the male shaft 12B.

That is, the shape of the urge sleeve portion 713 is the same as that of Embodiment 1, and gaps are always provided between the urge sleeve portion 713 and the contact face 414 of the female shaft 12A and the connecting face 514 of the male shaft 12B. Therefore, the urge sleeve portion 713 is elastically deformed freely at inside of the inner side circular arc gap 63, and the inclined sleeve portion 712 can always be applied with an urge force.

Further, a wall thickness of a connecting sleeve portion 7142 of Embodiment 3 is formed more thin-walled than that of Embodiment 1 and is formed by being bent into a waveform of one mountain. Further, an apex of the mountain of the waveform is always brought into contact with the bottom face 412 of the female shaft 12A and a gap is always provided between the apex and the top face 512 of the male shaft 12B. Further, only both ends of the inner periphery of the connecting sleeve portion 7142 are brought into contact with the top face 512 of the male shaft 12B. Therefore, the connecting sleeve portion 7142 urges the female shaft 12A to the outer side in the radial direction. Further, the connecting sleeve portion 7142 is elastically deformed freely at inside of the outer side circular arc shape gap 64, and the connecting sleeve portion 7142 can smoothly be moved by following the movement of the inclined sleeve portion 712.

Embodiment 4

Figure 12:
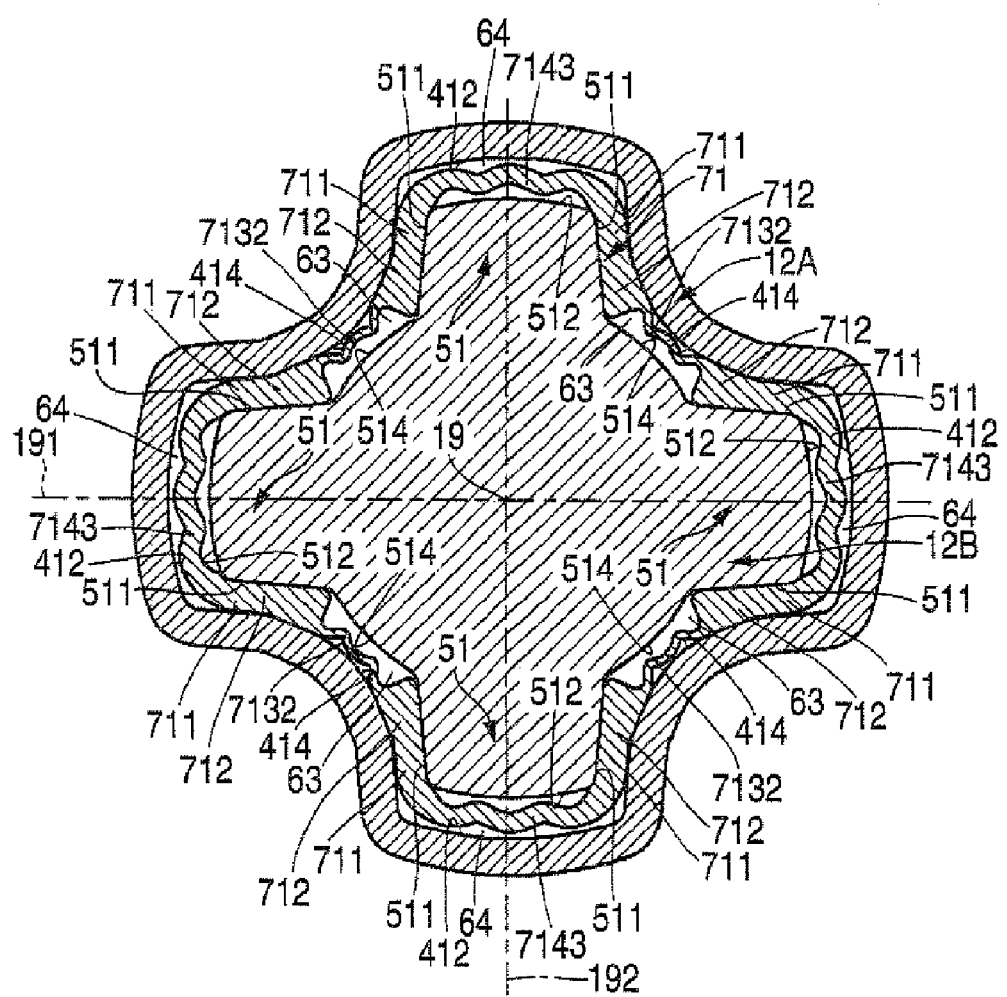
FIG. 12 shows a telescopic shaft of Embodiment 4 of the invention, corresponding to the enlarged sectional view taken along the line II-II of FIG. 2 constituting sections of the male shaft, the female shaft and the sleeve.

Next, embodiment 4 of the invention will be explained. FIG. 12 shows a telescopic shaft of Embodiment 4 of the invention, and corresponds to the enlarged sectional view taken along the line II-II of FIG. 2 constituting sections of a male shaft, a female shaft and a sleeve. In the following explanation, an explanation will be given only a structure portion and operation which differ from those of the above-described embodiments, and a duplicated explanation thereof will be omitted. Further, an explanation will be given by attaching the same numerals to parts the same as those of the above-described embodiments.

Embodiment 4 is a modified example of Embodiment 2 and is an example in which an urge sleeve portion and a connecting sleeve portion are constituted by shapes of waveforms, the connecting sleeve portion provides a gap between the outer periphery of the male shaft 12B and the inner periphery of the female shaft 12A, and a portion of the urge sleeve portion is brought into contact with the inner periphery of the female shaft 12A.

That is, in Embodiment 4, a wall thickness of an urge sleeve portion 7132 is more thin-walled than the interval of the inner side circular arc shape gap 63 between the connecting face 514 in the circular arc shape and the connecting face 514 in the circular arc shape and is formed by being bent into a waveform of two mountains. Further, apexes of the mountains of the waveform are always brought into contact with the connecting face 414 of the female shaft 12A, and gaps are always provided between the apexes and the connecting face 514 of the male shaft 12B. Therefore, the urge sleeve portion 7132 is elastically deformed freely at inside of the inner side circular arc shape gap 63, and the inclined sleeve portion 712 can always be applied with the urge force.

Further, a wall thickness of a connecting sleeve portion 7143 of Embodiment 2 is formed more or less thin-walled more than that of Embodiment 2 and the connecting sleeve portion 7143 is formed by being bent into a waveform of two mountains. Further, the mountains of the waveform are provided always with gaps between the mountains and the top face 512 of the male shaft 12B and the bottom face 412 of the female shaft 12A. Therefore, the connecting sleeve portion 7143 is elastically deformed freely at inside of the outer side circular arc shape gap 64, and the connecting sleeve portion 7143 can smoothly be moved by following the movement of the inclined sleeve portion 712.

Embodiment 5

Figure 13:
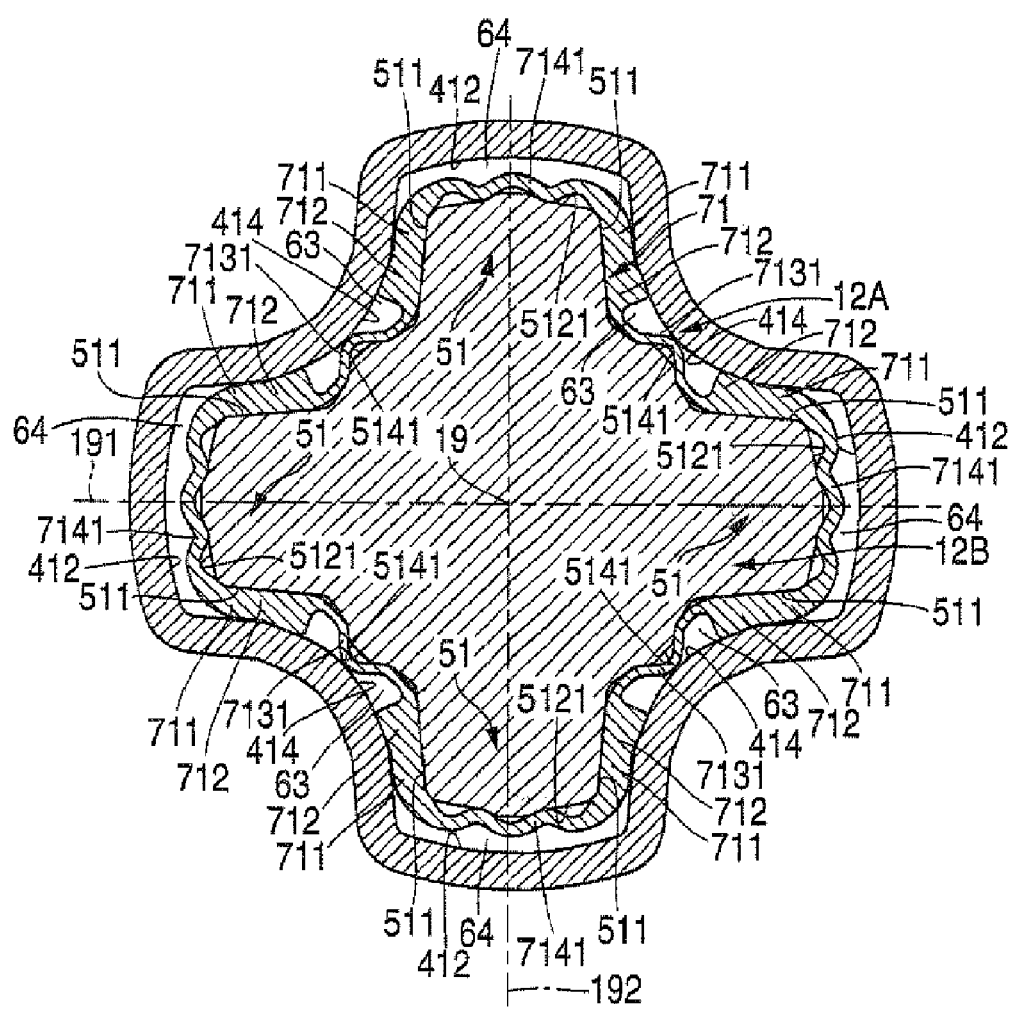
FIG. 13 shows a telescopic shaft of Embodiment 5 of the invention, corresponding to the enlarged sectional view taken along the line II-II of FIG. 2 constituting sections of the male shaft, the female shaft and the sleeve.

Next, Embodiment 5 of the invention will be explained. FIG. 13 shows a telescopic shaft of Embodiment 5, and corresponds to an enlarged sectional view taken along the line II-II of FIG. 2 constituting sections of a male shaft, a female shaft and a sleeve. In the following explanation, an explanation will be given only of a structure portion and operation which differ from those of the above-described embodiments and a duplicated explanation thereof will be omitted. Further, an explanation will be given by attaching the same numerals to parts the same as those of the above-described embodiments.

FIG. 5 is a modified example of Embodiment 2 and is an example in which the urge sleeve portion and the connecting sleeve portion are constituted by shapes of waveforms, a portion of the connecting sleeve portion is brought into contact with the outer periphery of the male shaft 12B, and portions of the urge sleeve portion are brought into contact with both of the inner periphery of the female shaft 12A and the outer periphery of the male shaft 12B.

That is, in Embodiment 5, the urge sleeve portion 7131 is formed by being bent into a waveform of one mountain similar to that of Embodiment 2. Further, an apex of the mountain of the waveform is always brought into contact with the connecting face 414 of the female shaft 12A. Further, the male shaft 12B is formed with a connecting face 5141 in a mountain shape and an inclined face of the mountain of the waveform of the urge sleeve portion 7131 is always brought into contact with the connecting face 5141 in the mountain shape. Therefore, the urge sleeve portion 7131 is elastically deformed freely at inside of the inner side circular arc shape gap 63, and the inclined sleeve portion 712 can always be applied with the urge force.

Further, the connecting sleeve portion 7141 of Embodiment 5 is formed by being bent into a waveform of two mountains similar to that of Embodiment 2 Further, the male shaft 12B is formed with a top face 5121 in a mountain shape, and an inclined face of the mountain of the waveform of the connecting sleeve portion 7141 is always brought into contact with the top face 5121 in the mountain shape of the male shaft 12B, and gaps are always provided between the mountains and the bottom face 4121 of the female shaft 12A. Therefore, the connecting sleeve portion 7141 is elastically deformed freely at inside of the outer side circular arc shape gap 64, and the connecting sleeve portion 7141 can smoothly be moved by following the movement in the inclined sleeve portion 712.

Embodiment 6

Figure 14:
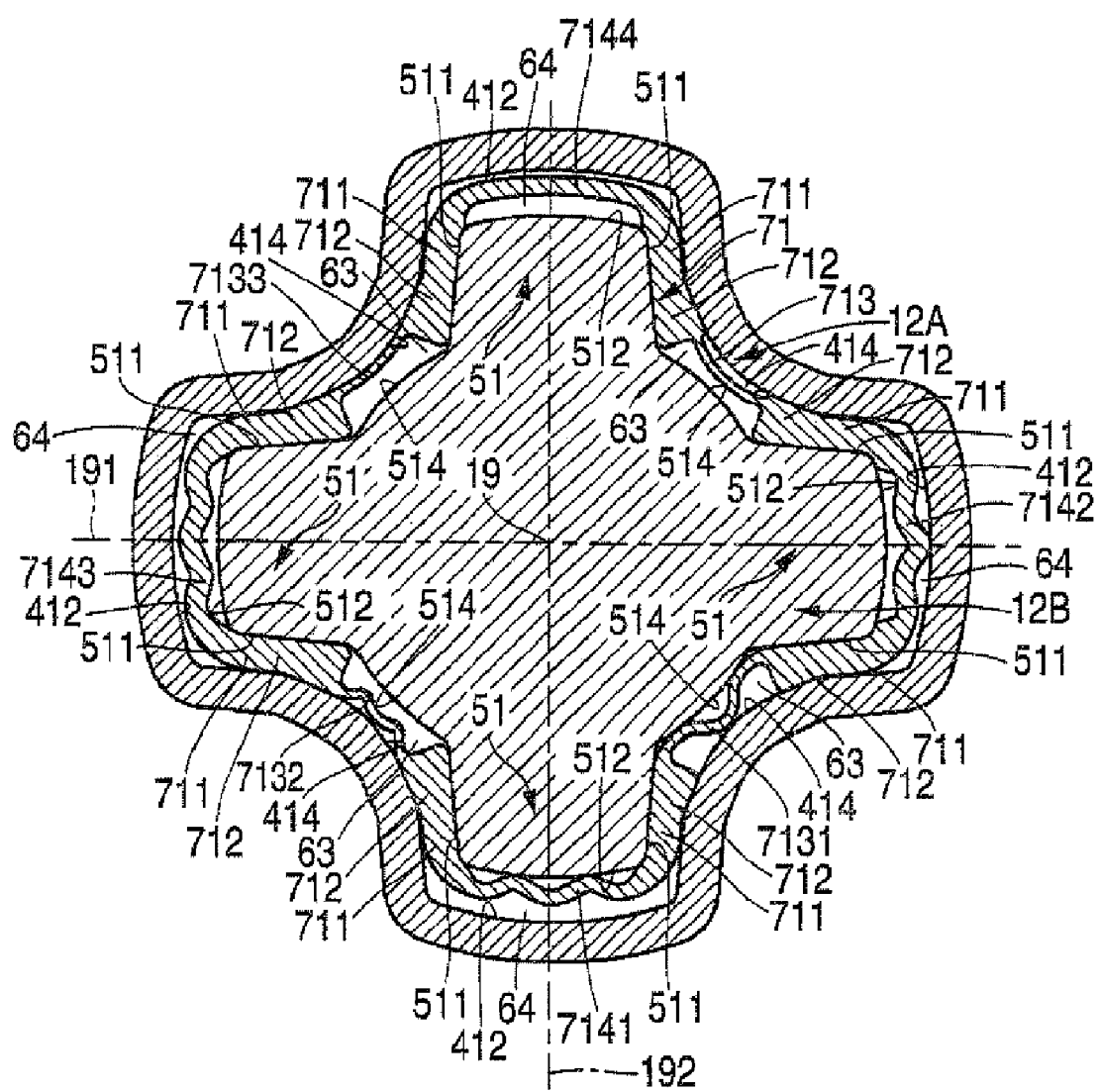
FIG. 14 shows a telescopic shaft of Embodiment 6 of the invention, corresponding to the enlarged sectional view taken along the line II-II of FIG. 2 constituting sections of the male shaft, the female shaft and the sleeve.

Next, Embodiment 6 of the invention will be explained. FIG. 14 shows a telescopic shaft of Embodiment 6 of the invention and corresponds to the enlarged sectional view taken along the line II-II of FIG. 2 constituting sections of a male shaft, a female shaft and a sleeve. In the following explanation, an explanation will be given only of a structure portion and operation which differ from those of the above-described embodiments and a duplicated explanation thereof will be omitted. Further, an explanation will be given by attaching the same numerals to parts the same as those of the above-described embodiments.

Embodiment 6 is an example of arranging 4 kinds of urge sleeve portions and 4 kinds of connecting sleeve portions having different shapes to respectives of the axial grooves 41 and the axial projected streaks 51 at 4 portions. An arbitrary combination of the urge sleeve portion and the connecting sleeve portion may be selected by selecting single kinds of the urge sleeve portion and the connecting sleeve portions.

That is, in Embodiment 6, the urge sleeve portion 7131 on a right skewed lower side of FIG. 14 is formed by being bent into the waveform of one mountain similar to that of Embodiment 2. Further, the apex of the mountain of the waveform is always brought into contact with the connecting face 714 of the female shaft 12A. Further, the both ends of the inner periphery of the urge sleeve portion 7131 are always brought into contact with the connecting face 514 of the male shaft, and the center portion of the inner periphery of the urge sleeve portion 7131 is provided always with the gap between the center portion and the connecting face 514 of the male shaft. Thereby, the urge sleeve portion 7131 is always pressed by the connecting face 414 to generate the urge force, and the urge force in the direction of expanding an interval of the inner side circular arc shape gap 63 is applied between the male shaft 12B and the female shaft 12A.

Further, the connecting sleeve portion 7141 on a lower side of FIG. 14 is formed by being bent into a waveform of two mountains similar to that of Embodiment 2. Further, the apexes of the mountains of the waveform are always brought into contact with the top face 512 of the male shaft 12B, and the gaps are always provided between the apexes and the bottom face 412 of the female shaft 12A.

Further, the urge sleeve portion 713 on a right skewed upper side of FIG. 14 is always provided with the gaps between the urge sleeve portion 713 and the connecting face 414 of the female shaft 12A and the connecting face 514 of the male shaft 12B similar to those of Embodiment 3.

Further, the connecting sleeve portion 7142 on a right side of FIG. 14 is formed by being bent into the waveform of one mountain similar to that of Embodiment 3, the apex of the mountain of the waveform is always brought into contact with the bottom face 412 of the female shaft 12A, and the gaps is always provided between the mountain and the top face 512 of the male shaft 12B.

The urge sleeve portion 7132 on a left skewed lower side of FIG. 14 is formed by being bent into the waveform of two mountains similar to that of Embodiment 4. Further, the apex of the mountain of the waveform is always brought into contact with the connecting face 414 of the female shaft 12A and the gap is always provided between the mountain and the connecting face 514 of the male shaft.

Further, the connecting sleeve portion 7143 on a right side of FIG. 14 is formed by being bent into the waveform of two mountains similar to that of Embodiment 4. Further, the mountain of the waveform is provided always with gaps between the mountain and the top face 512 of the male shaft 12B and the bottom face 412 of the female shaft 12A.

The urge sleeve portion 7133 on a left skewed upper side of FIG. 14 is provided with a large gap between the urge sleeve portion 7133 and the connecting face 514 of the male shaft 12B and a small gap is always provided between the urge sleeve portion 7133 and the connecting face 414 of the female shaft 12A. Further, the connecting sleeve portion 7144 on an upper side of FIG. 14 is formed to be more thin-walled than that of Embodiment 1 and the gaps are always provided between the connecting sleeve portion 7144 and the bottom face 412 and the top face 512.

Therefore, the urge sleeve portions 713, 7131, 7132, 7133 are elastically deformed freely at inside of the inner side circular arc shape gap 63 to be able to always apply the urge force to the inclined sleeve portions 712.

Further, the connecting sleeve portion 7141, 7142, 7143, 7144 are elastically deformed freely at inside of the outer side circular arc shape gap 64 to be able to freely move the connecting sleeve portions 7141, 7142, 7143, 7144 by following the movement of the inclined sleeve portions 712.

Embodiment 7

Figure 15:
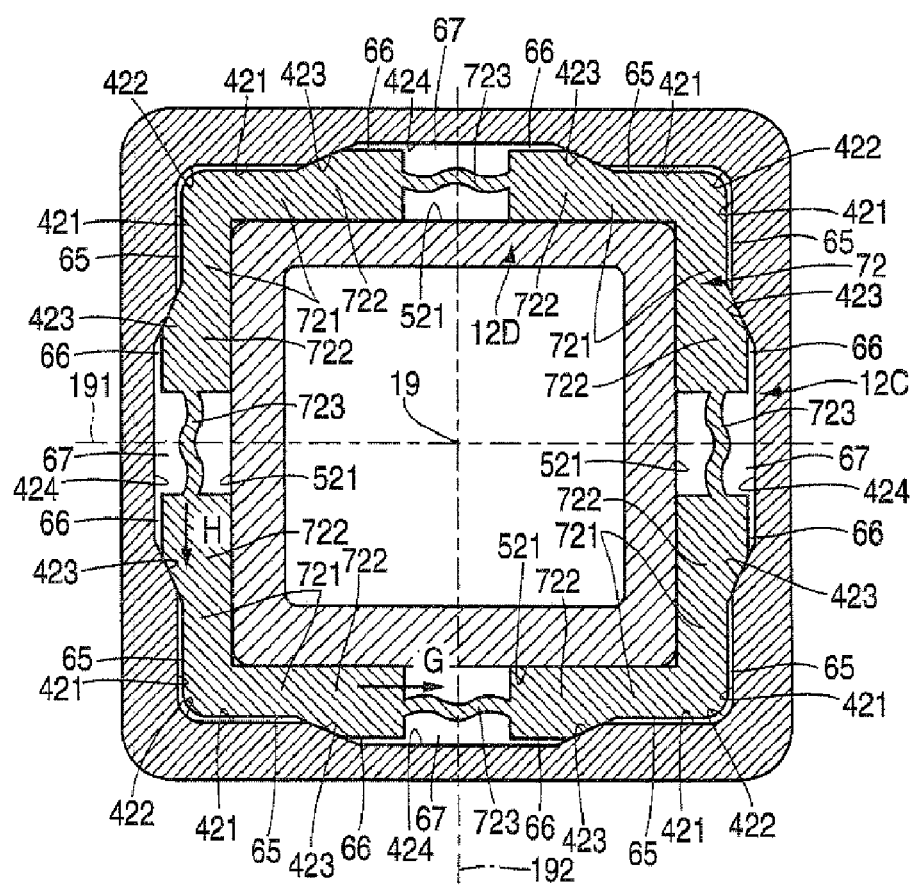
FIG. 15 shows a telescopic shaft of Embodiment 7 of the invention, corresponding to the enlarged sectional view taken along the line II-II of FIG. 2 constituting sections of the male shaft, the female shaft and the sleeve.

Next, Embodiment 7 of the invention will be explained. FIG. 15 shows a telescopic shaft of Embodiment 7 of the invention and corresponds to the enlarged sectional view taken along the line II-II of FIG. 2 constituting sections of a male shaft, a female shaft and a sleeve. In the following explanation, an explanation will be given only of a structure portion and operation which differ from those of the above-described embodiments and a duplicated explanation thereof will be omitted. Further, an explanation will be given by attaching the same numerals to parts the same as those of the above-described embodiments.

Embodiment 7 is a modified example of Embodiment 1 and an example of being applied to a male shaft having a rectangular outer periphery and a female shaft having a rectangular inner periphery. That is, as shown by FIG. 15, a female shaft 12C is formed by a shape of a hollow rectangular cylinder. An inner periphery of the rectangle is formed with respective 2 pieces of parallel inner peripheral faces 421 passing an axis center 19 of the female shaft 12C and in parallel with the center line 191 horizontal in a left and right direction, or the center line 192 passing the axis center 19 and vertical in an up and down direction at vicinities of corner portions of 4 portions. The corner portions intersected with the parallel inner peripheral faces 421 are smoothly connected by R faces 422.

Further, inclined inner peripheral faces 423 inclined to the parallel inner peripheral faces 421 by predetermined angles are formed to extend to a side of the center line 191 or the center line 192 from end portions on the side of the center line 191, or end portions on the side of the center line 192 of the parallel inner peripheral faces 421. Further, end portions on the side of the center line 191, or end portions on the side of the center line 192 of the inclined inner peripheral faces 423 are smoothly connected to end portions on the side of the center line 191 or end portions on the side of the center line 192 of the inclined inner peripheral faces 423 contiguous thereto by connecting faces 424 in parallel with the center line 191 or the center line 192.

Further, a male shaft 12D is formed by a shape of a hollow rectangular cylinder. Further, an outer periphery of the rectangle is formed with 4 pieces of parallel outer peripheral faces 521. The parallel outer peripheral faces 521 are formed in parallel with the center line 191 passing axis center 19 and horizontal in the left and right direction, or the center line 192 passing the axis center 19 and vertical in the up and down direction.

Therefore, a parallel gap 65 having a constant interval is formed between the parallel outer peripheral face 521 of the male shaft 12D and the parallel inner peripheral face 421 of the female shaft 12C. Further, an inclined gap 66 narrowing an interval to the corner portion is formed between the parallel outer peripheral face 521 of the male shaft 12D and the inclined inner peripheral face 423 of the female shaft 12C, and a minimum gap portion on a side of the corner portion of the inclined gap 66 is continuously connected to the parallel gap 65.

A sleeve 42 in a ring-like shape formed by an elastic member is inserted to the gap between the outer periphery of the male shaft 12D and the inner periphery of the female shaft 12C. The sleeve 72 is formed in the ring-like shape by arranging partial sleeves each constituted by three elements of a parallel sleeve portion 721, an inclined sleeve portion 722, an urge sleeve portion 723 in line symmetry relative to the center lines 191, 192 and connecting both ends thereof to the contiguous partial sleeves.

The parallel sleeve portion 721 is inserted to the parallel gap 65, the inclined sleeve portion 722 is inserted to the inclined gap 66, the urge sleeve portion 723 in a waveform shape is inserted to the rectangular gap 67 between the connecting face 424 of the female shaft 12C and the parallel outer peripheral face 521 of the male shaft 12D.

When the sleeve 72 is outwardly fitted to the outer periphery of the male shaft 12D, since the urge sleeve portion 723 is formed to be more thin-walled than the parallel sleeve portion 721 and the inclined sleeve portion 722, a diameter of the urge sleeve portion 723 is elastically expanded, and the sleeve 72 can outwardly be fitted easily to the outer periphery of the male shaft 12D.

Successively, the female shaft 12C is outwardly fitted to the male shaft 12D outwardly fitted with the sleeve 72. Then, since the outer periphery of the inclined sleeve portion 722 is provided with a predetermined fastening margin relative to the inclined inner peripheral face 423 of the female shaft 12C, when the female shaft 12C is outwardly fitted to the male shaft 12D against the fastening margin, the inclined sleeve portion 722 is moved in an arrow mark G direction.

When the inclined sleeve portions 722 are moved in the arrow mark G direction, the urge sleeve portions 723 formed to be thin-walled are pressed to be elastically deformed by being folded to bend to the sides of the center lines 191 and 192.

A wall thickness of the urge sleeve portion 723 is formed to be thinner than an interval of the rectangular gap 67 between the connecting face 424 of the female shaft 12C and the parallel outer peripheral face 521 of the male shaft 12D and a gap is always provided between the connecting face 424 and the parallel outer peripheral face 521. Therefore, the urge sleeve portion 423 is elastically deformed by being folded to bend easily, and the inclined sleeve portion 722 can smoothly be moved in the arrow mark G direction.

Since the urge sleeve portion 723 is elastically deformed, the inclined sleeve portion 722 is operated with an urge force in a direction of pressing the inclined sleeve portion 722 to an inclined gap 66 by an elastic force of the urge sleeve portion 723. That is, the inclined sleeve portion 722 is pressed from a maximum gap portion on a side opposed to the corner portion of the inclined gap 66 to a minimum gap portion on a side of the corner portion. Therefore, there is not backlash between the male shaft 12D and the female shaft 12C, further, a predetermined preload is applied between the male shaft 12D and the female shaft 12C.

When a position in a front and rear direction of the vehicle body of the steering wheel is adjusted, the outer column is telescopically moved to the inner column, and the female shaft 12C is slid in an axial direction to the male shaft 12D.

By sliding the female shaft 12C in the axial direction, the outer periphery of the inclined sleeve portion 722 is slid while always being brought into contact with the inclined inner peripheral face 423 of the female shaft 12C. Therefore, the outer periphery of the inclined sleeve portion 722 is gradually worn by a friction force in sliding. However, the urge force in the direction of pressing the inclined sleeve portion 722 to the inclined gap 66 is always operated to an inclined sleeve portion 722 by the elastic force of the urge sleeve portion 723, and therefore, the preload is not reduced.

That is, the urge sleeve portion 723 is interposed between the connecting face 424 and the parallel outer peripheral face 521 by always providing the gap therebetween, and therefore, the urge sleeve portion 723 is not worn. Therefore, even when the outer periphery of the inclined sleeve portion 722 is worn, the inclined sleeve portion 722 is further pressed by the elastic force of the urge sleeve portion 723 from the maximum gap portion to the minimum gap portion of the inclined gap 66 by an amount of wearing the outer periphery of the inclined sleeve portion 722. Therefore, the inclined sleeve portion 722 is always operated with the predetermined urge force.

When a wheel, not illustrated, is steered by rotating the steering wheel in the clockwise direction, a rotating torque is operated between the female shaft 12C and the male shaft 12D, and the inclined sleeve portion 722 is moved in the arrow mark G direction by a load thereof. The parallel sleeve portion 721, the inclined sleeve portion 722 on an oppose side by interposing the corner portion are pulled to move in an arrow mark H direction. Further, the urge sleeve portion 723 is elastically deformed by being folded to bend by being pressed by the inclined sleeve portion 722.

By the elastic deformation of the urge sleeve portion 723, the inclined sleeve portion 722 is maintained in a state of operating a constant urge force in a direction of pressing the inclined sleeve portion 722 to the inclined gap 66. Therefore, there is not backlash between the male shaft 12D and the female shaft 12C, further, a state of applying the predetermined prepressure between the male shaft 12D and the female shaft 12C is maintained.

When the rotational torque is increased to a predetermined value, the outer periphery of the parallel sleeve portion 721 and the parallel inner peripheral face 421 of the female shaft 12C are brought into close contact with each other. Therefore, the rotational torque is transmitted from the female shaft 12C to the male shaft 12D between the outer periphery of the parallel sleeve portion 721 and the parallel inner peripheral face 421 of the female shaft 12C.

At this occasion, intervals between the parallel gaps 65 and the inclined gaps 66 disposed at positions symmetrical with each other by interposing the corner portion are increased.

However, by elastic forces of the urge sleeve portions 723 connected to the inclined sleeve portions 722 disposed at the symmetrical positions, a state of operating the urge forces in the directions of pressing the inclined sleeve portions 722 to the inclined gaps 66 is maintained. Therefore, a state of bringing the inclined gaps 66 and the inclined sleeve portions 722 at the symmetrical positions into close contact with each other is maintained.

Embodiment 8

Figure 16:
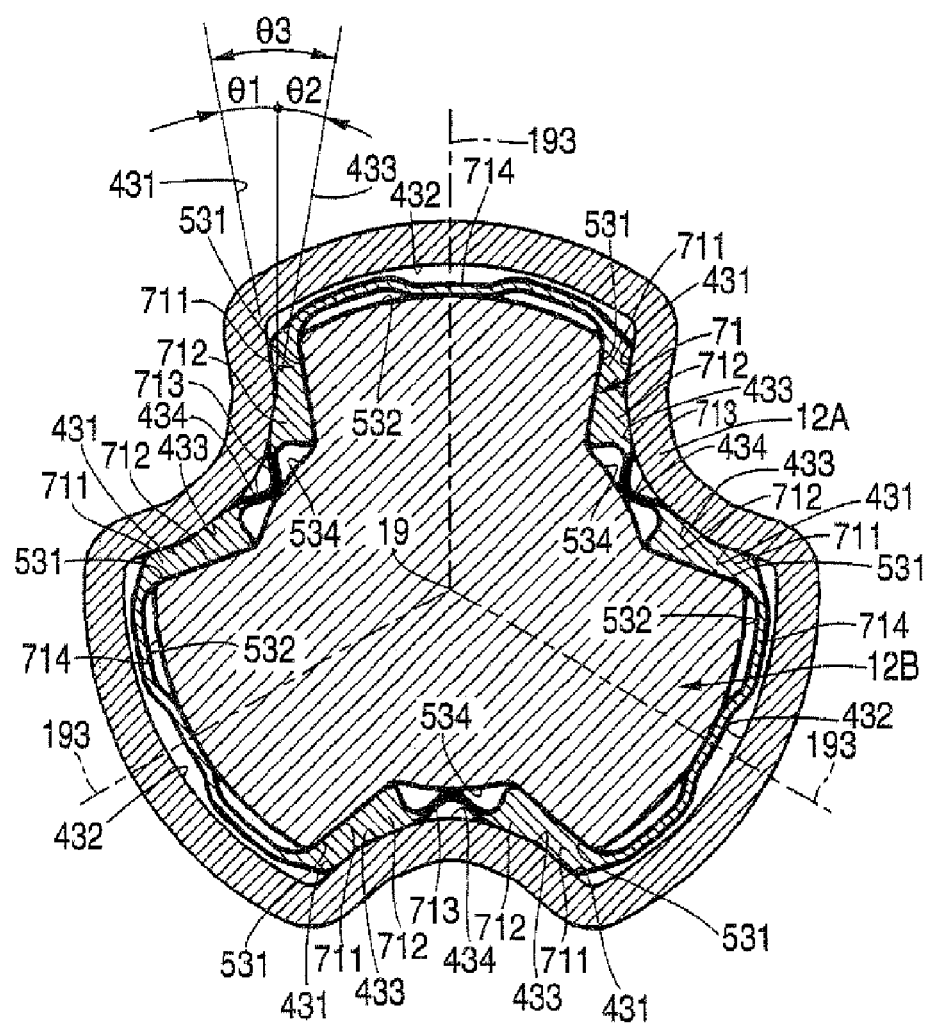
FIG. 16 shows a telescopic shaft of Embodiment 8 of the invention, corresponding to the enlarged sectional view taken along the line II-II of FIG. 2 constituting sections of the male shaft, the female shaft and the sleeve.

Next, Embodiment 8 of the invention will be explained. FIG. 16 shows a telescopic shaft of Embodiment 8 of the invention and corresponds to the enlarged sectional view taken along the line II-II of FIG. 2 constituting sections of a male shaft, a female shaft and a sleeve. In the following explanation, an explanation will be given only of a structure portion and operation which differ from those of the above-described embodiments and a duplicated explanation thereof will be omitted. Further, an explanation will be given by attaching the same numerals to parts the same as those of the above-described embodiments.

Embodiment 8 is a modified example of Embodiment 1 and is an example in which an interval between side faces of a groove in an axial direction and an interval between side faces of a projected streak in an axial direction are formed to widen to an outer side in a radial direction, and numbers of the axial grooves and the axial projected streaks are respectively constituted by 3 pieces.

As shown by FIG. 16, the female shaft 12A is formed by a shape of a hollow cylinder, and an inner periphery thereof is formed with 3 pieces of grooves in an axial direction radially from the axis center 19 of the female shaft 12A over a total length of an elongating and contracting stroke at equal intervals (120 degrees intervals) The respective axial grooves include outer side faces 431, 431 respectively formed by an angle θ1 relative to 3 pieces of center lines 193, 193, 193 passing the axis center 19.

The interval between the outer side faces 431 and 431 constituting the one axial groove is widened to the outer side in the radial direction. Further, outer ends in the radial direction of the outer side face 431, 431 are smoothly fitted to the bottom face 432 in a shape of a circular arc convex to the outer side, and sections orthogonal to the axis of the respective axial grooves are formed substantially by a channel-like shape by the outer side faces 431, 431 and the bottom faces 432.

Further, inner side faces 433, 433 are formed to be extended to the inner side in the radial direction from inner ends in the radial direction of the outer side faces 431, 431 by an angle θ2 in directions reverse to those of the angle θ1 relative to 3 pieces of the center lines 193, 193, 193. An interval between the inner side faces 433, 433 is narrowed to the outer side in the radial direction. Further, inner ends in the radial direction of the inner side faces 433, 433 are smoothly connected to inner ends in the radial direction of the inner side faces 433, 433 contiguous thereto by connecting faces 434 in a circular arc shape convex to the inner side.

Further, the male shaft 12B is formed with 3 pieces of axial projected streaks radially from the axis center 19 at positions of phases the same as those of the axial grooves at equal intervals (120 degrees intervals).

The axial projected streaks are provided with side faces 531, 531 in parallel with the outer side faces 431, 431 of the axial grooves. The side faces 531 of the axial projected streaks may substantially be in parallel with the outer side faces 431 of the axial grooves. Therefore, an interval between the side face 531 and the side face 531 constituting the one axial projected streak is widened to the outer side in the radial direction.

Further, outer ends in the radial direction of the side faces 531, 531 are connected to top faces 532 in a circular arc shape convex to the outer side, and sections orthogonal to the axis center of the respective axial projected streaks are formed substantially in a channel-like shape by the side faces 531, 531 and the top faces 532. Inner ends in the radial direction of the side face 531, 531 are connected to inner ends in the radial direction of the side face 531, 531 contiguous thereto by connecting faces 534 in a circular arc shape convex to the outer side.

Therefore, parallel gaps having constant intervals are formed between the side faces 531, 531 of the axial projected streaks of the male shaft 12B and the outer side faces 431, 431 of the axial grooves of the female shaft 12A. Further, inclined gaps narrowing intervals to the outer side in the radial direction are formed between the side faces 531, 531 of the axial projected streaks of the male shaft 12B and the inner side faces 433, 433 of the axial grooves of the female shaft 12A, and minimum gap portions of outer ends in the radial direction of the inclined gaps are continuously connected to the parallel gaps.

The sleeve 71 in the ring-like shape formed by an elastic member is inserted to the gap between the outer periphery of the male shaft 12B and the female shaft 12A. The sleeve 71 is formed in the ring-like shape by arranging the partial sleeves each constituted by three elements of the parallel sleeve portions 711, the inclined sleeve portion 712, the urge sleeve portion 713 in line symmetry relative to the center lines 193, 193, 193 and connecting the both ends to the contiguous partial sleeves.

The parallel sleeve portion 711 is inserted to the parallel gap, the inclined sleeve portion 712 is inserted to the inclined gap, and the urge sleeve portion 713 is inserted to an inner side circular arc shape gap between the connecting face 534 in a circular arc shape and the connecting face 434 in a circular arc shape. Further, the outer end in the radial direction of the parallel sleeve portion 711 is formed with the connecting sleeve portion 714 in the circular arc shape, and the connecting sleeve portion 714 is inserted to an outer side circular arc shape gap between the bottom face 432 in the circular arc shape and the top face 532 in the circular arc shape and is connected to the outer end in the radial direction of the parallel sleeve portion 711 contiguous thereto.

The urge sleeve portion 713 and the connecting sleeve portion 714 are formed to be thinner than the parallel sleeve portion 711 and the inclined sleeve portion 712. Therefore, when the sleeve 71 is outwardly fitted to the outer periphery of the male shaft 12B, diameters of the urge sleeve portion 713 and the connecting sleeve portion 714 are elastically expanded to the outer side in the radial direction, and the sleeve 71 can outwardly be fitted easily to the outer periphery of the male shaft 12B.

A wall thickness of the urge sleeve portion 713 is formed to be thinner than an interval of the inner side circular arc shape gap between the connecting face 534 in the circular arc shape and the connecting face 434 in the circular arc shape, the urge sleeve portion 713 is elastically formed by being folded to bend in a convex shape to the side of the axis center 19 and formed by being bent into a waveform of one mountain. Further, an apex of the mountain in the waveform is always brought into contact with the connecting face 534 of the male shaft 12B. Therefore, the urge sleeve portion 713 is elastically deformed freely at inside of the inner side circular arc shape gap to be able to always apply an urge force to the inclined sleeve portion 712.

Further, a wall thickness of the connecting sleeve portion 714 is formed to be further thinner than those of the above-described embodiments and is formed by being bent into a waveform of one mountain. Further, an apex of the mountain of the waveform is always brought into contact with the top face 532 of the male shaft 12B, and a gap is always provided between the mountain and the bottom face 432 of the female shaft 12A. Therefore, the connecting sleeve portion 714 is elastically deformed freely at inside of the outer side circular arc shape gap, and the connecting sleeve portion 714 can smoothly be moved by following movement of the inclined sleeve portion 712.

Since the urge sleeve portion 713 is elastically deformed, the inclined sleeve portion 712 is operated with an urge force in a direction of pressing the inclined sleeve portion 712 to the inclined gap by an elastic force of the urge sleeve portion 713. Therefore, there is not backlash between the male shaft 12B and the female shaft 12A. Further, a predetermined preload is applied between the male shaft 12B and the female shaft 12A. A wedge angle $\theta 3$ ($\theta 3 = \theta 2 + \theta 1$) of the inclined sleeve portion 712 is set to be larger than a frication angle (5.7 degrees through 23 degrees) of the inclined sleeve portion 712 to prevent the inclined sleeve portion 712 from being self-locked at inside of the inclined gap. Although the outer side face 431 of the axial groove is formed to be inclined to the center line 193 by the angle $\theta 1$, the outer side face 431 may be formed in parallel with the center line 193. Further, the side face 531 of the axial projected streak may substantially be in parallel with the outer side face 431 of the axial groove. That is, the wedge angle $\theta 3$ is a relative angle between the side face 531 of the axial projected streak and the inner side face 433 of the axial groove.

When a wheel, not illustrated, is steered by rotating the steering wheel 11 in the clockwise direction, a rotational torque is operated between the female shaft 12A and the male shaft 12B, and the outer periphery of the parallel sleeve portion 711 and the outer side face 431 of the female shaft 12A are brought into close contact with each other by a load operated between the outer periphery of the parallel sleeve portion 711 and the male shaft 12B. Therefore, the rotational torque is transmitted from the female shaft 12A to the male shaft 12B between the outer periphery of the parallel sleeve portion 711 and the outer side face 431 of the female shaft 12A.

The outer side faces 431 of the axial groove and the side face 531 of the axial projected streak for transmitting the load are widened to the outer side in the radial direction. Therefore, a direction of the load when the rotational torque is transmitted from the female shaft 12A to the male shat 12B and the outer side face 431 and the side face 531 receiving the load are orthogonal to each other, and therefore, the load can effectively be received. Although numbers of the axial grooves and the axial projected streaks are respectively set to 3 pieces in Embodiment 8, the number may be equal to or larger than 2 pieces.

Embodiment 9

Figure 17A:
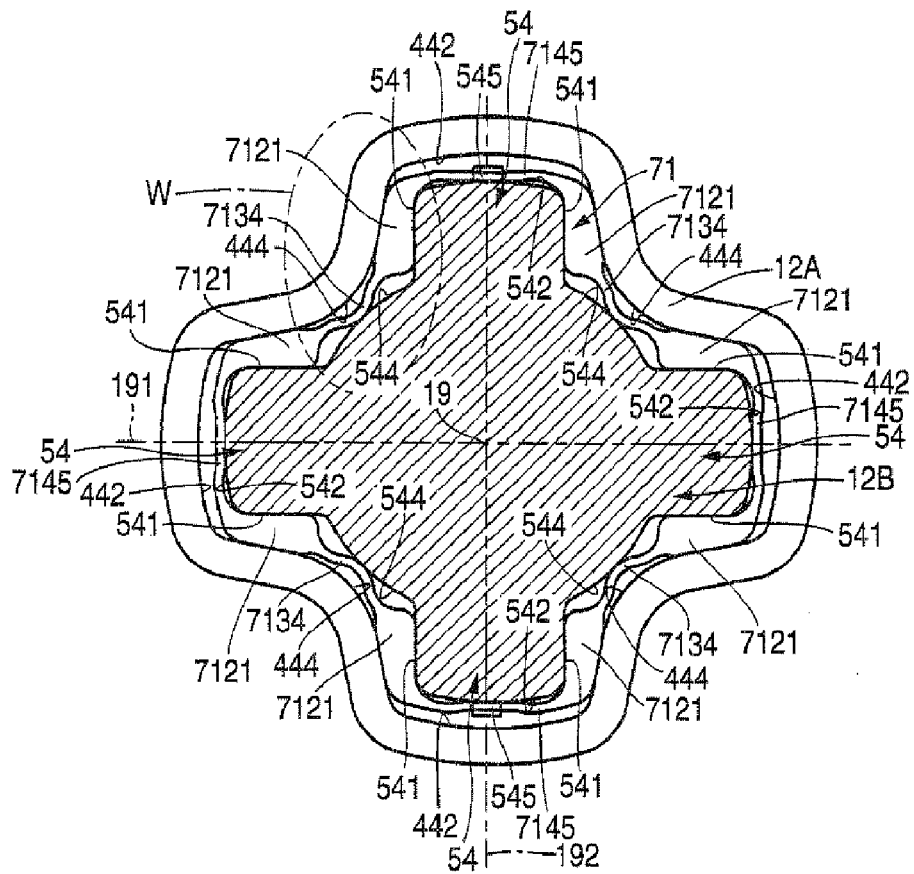
FIGS. 17A and 17B show a telescopic shaft of Embodiment 9 of the invention.
Figure 17B:
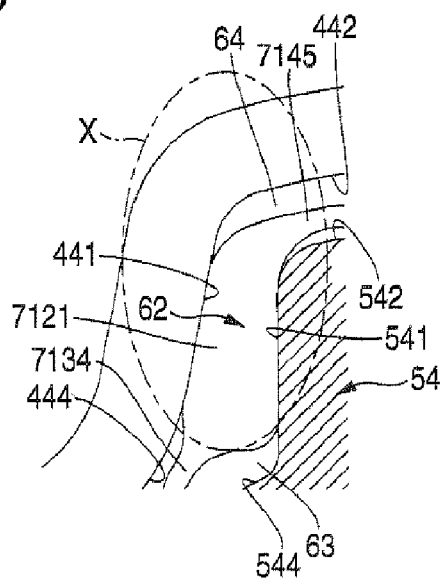
Figure 18:
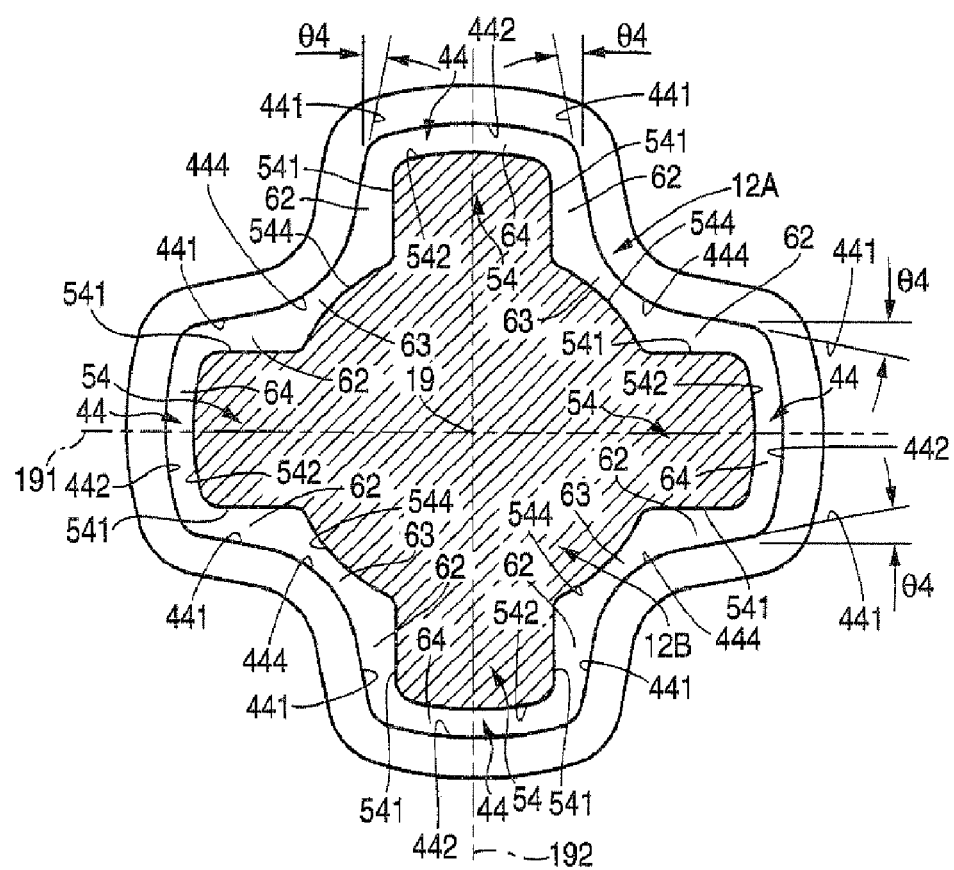
FIG. 18 is an enlarged sectional view showing only a male shaft and a female shaft by detaching a sleeve from FIG. 17A.

Next, Embodiment 9 of the invention will be explained. FIGS. 17A and 17B show a telescopic shaft of Embodiment 9 of the invention. FIG. 17A corresponds to the enlarged sectional view taken along the line II-II of FIG. 2 FIG. 17B is a sectional view enlarging W portion of FIG. 17A. FIG. 18 is an enlarged sectional view showing only a male shaft and a female shaft by detaching a sleeve from FIG. 17A.

Figure 19:
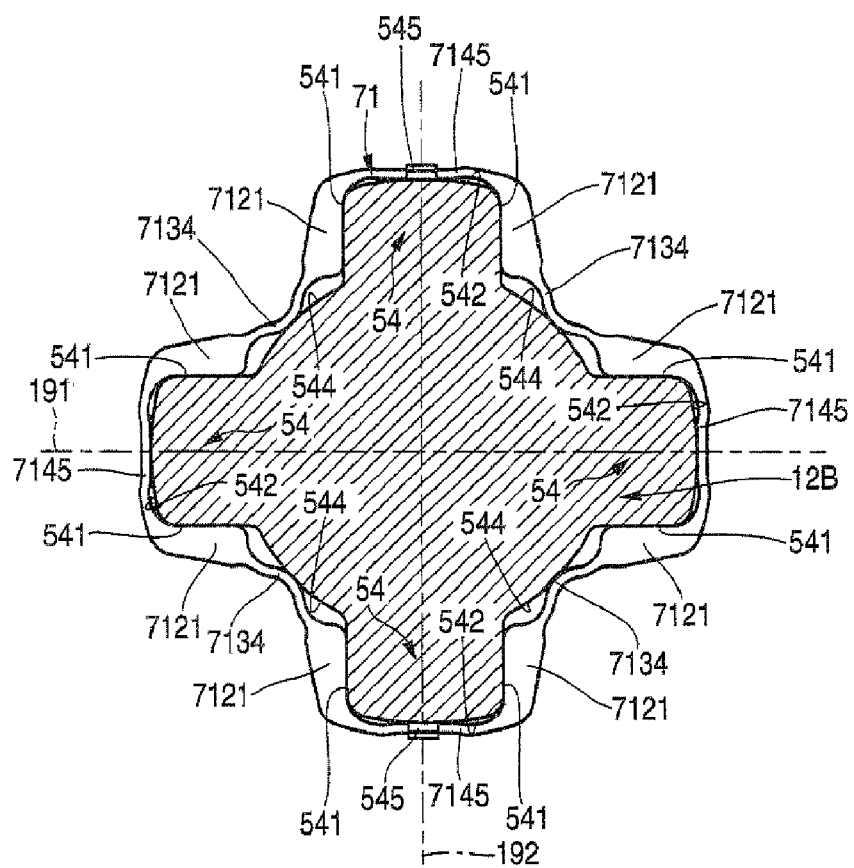
FIG. 19 is an enlarged sectional view showing a state of attaching the sleeve to the male shaft and before outwardly fitting the female shaft in FIG. 17A.
Figure 20:
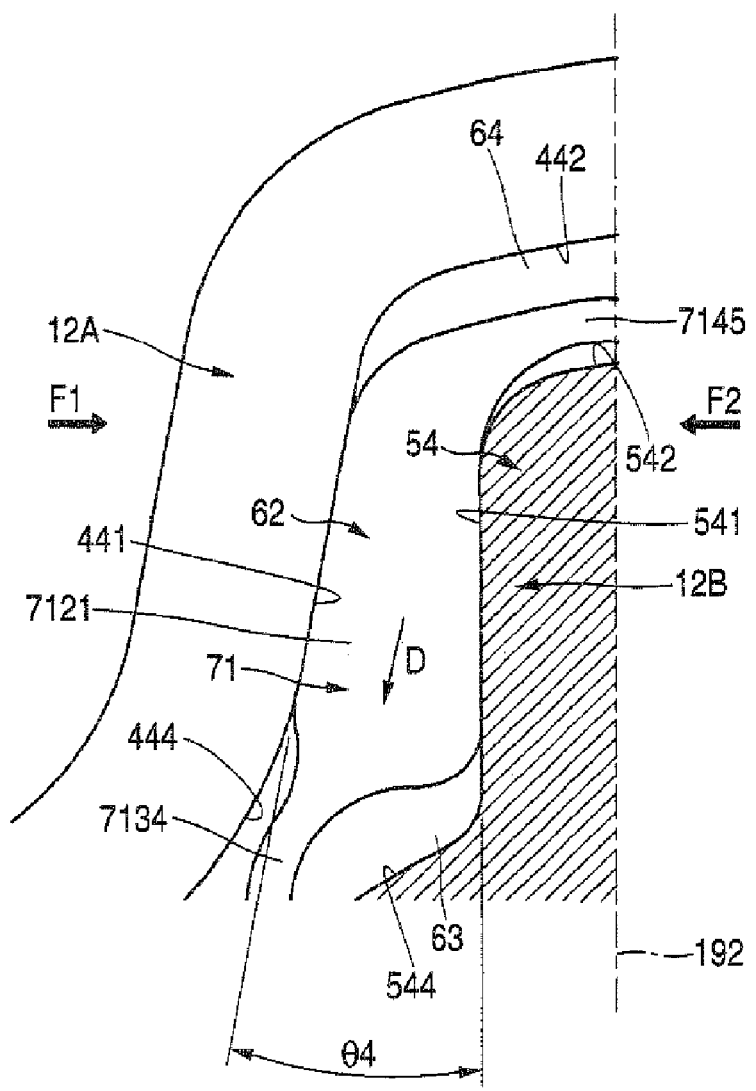
FIG. 20 is a sectional view enlarging X portion of FIG. 17B.

FIG. 19 is an enlarged sectional view showing a state of attaching a sleeve to a male shaft and before outwardly fitting a female shaft in FIG. 17A. FIG. 20 is a sectional view enlarging X portion of FIG. 17B. In the following explanation, an explanation will be given only of a structure portion and operation which differ from those of the above-described embodiments, and a duplicated explanation will be omitted. Further, an explanation thereof will be given by attaching the same numerals to parts the same as those of the above-described embodiments.

Embodiment 9 is an modified example of Embodiment 1 and is an example in which by omitting the parallel gap 61 and the parallel sleeve portion 711 of Embodiment 1, a structure of the telescopic shaft is simplified, the urge sleeve portion and the connecting sleeve portion are constituted by waveform shapes, and both of the connecting sleeve portion and the urge sleeve portion are partially brought into contact with an outer periphery of the male shaft 12B.

As shown by FIG. 18, the female shaft 12A is formed by a shape of a hollow cylinder, and an inner periphery thereof is formed with 4 pieces of grooves in an axial direction 44, 44, 44, 44 radially from the axis center 19 of the female shaft 12A over a total length of an elongating and contracting stroke at equal intervals (90 degrees intervals). The respective axial grooves 44 are provided with side faces 441, 441 formed by an angle $\theta 4$ relative to the center line 191 passing the axis center 19 and horizontal in a left and right direction in FIGS. 17A and 17B, and FIG. 18, or the center line 192 passing the axis center 19 and vertical in an up and down direction in FIGS. 17A and 17B, and FIG. 18.

Therefore, an interval between the side faces 441 and 441 constituting the one axial groove 44 is narrowed to the outer side in the radial direction. Further, outer ends in the radial direction of the side faces 441, 441 are smoothly connected to bottom faces 442 in a circular arc shape convex to the outer side, and sections orthogonal to the axis of the respective axial grooves 44 are formed substantially by a channel-like shape by the side faces 441, 441 and the bottom faces 442.

Although the axial groove 41 of Embodiment 1 is constituted by 2 kinds of the side faces having different angles (outer side face 411 of angle θ1, the inner side face 413 of angle θ2), Embodiment 9 is constituted by one kind of the side face 441. Inner ends in the radial direction of the side faces 441, 441 are smoothly connected to inner ends in the radial direction of the side faces 441, 441 contiguous thereto by connecting faces 444 in a circular arc shape convex to the inner side.

Further, as shown by FIG. 18, an outer periphery of a large diameter portion on a rear side of the vehicle body of the male shaft 12B is formed with 4 pieces of axial projected streaks 54, 54, 54, 54 over an entire length in the axial direction of the outer periphery of the large diameter portion radially from the axis center 19 at positions of phases the same as those of the axial grooves 44 at equal intervals (90 degrees intervals).

The axial projected streak 54 is provided with side faces 541, 541 in parallel with the center line 191 passing the axis center 19 and horizontal in the left and right direction, or the center line 192 passing the axis center 19 and vertical in the up and down direction. Therefore, an interval between the side face 541 and the side face 541 constituting the one axial projected streak 54 is constant.

Further, outer ends in the radial direction of the side face 541, 541 are connected to top faces 542 in a circular arc shape convex to the outer side, and sections orthogonal to the axis of the respective axial projected streaks 54 are formed substantially by a channel-like shape by the side faces 541, 541 and the top faces 542. Inner ends in the radial direction of the side faces 541, 541 are connected to inner ends in the radial direction of the side faces 541, 541 contiguous thereto by connecting faces 544 in a circular arc shape convex to the outer side.

Therefore, inclined gaps 62 narrowing an interval to the outer side in the radial direction are formed between the side faces 541, 541 of the axial projected streaks 54 of the male shaft 12B and the side faces 441, 441 of the axial grooves 44 of the female shaft 12A. Therefore, according to Embodiment 9, the parallel gap having constant interval as in Embodiment 1 is omitted.

As shown by FIGS. 17A and 17B, and FIG. 19, the sleeve 71 in a ring-like shape formed by an elastic member is inserted to a gap between the outer periphery of the male shaft 12D and the female shaft 12A. The sleeve 71 is formed by a ring-like shape by arranging partial sleeves each constituted by two elements of an inclined sleeve portion 7121 and an urge sleeve portion 7134 in line symmetry relative to the center lines 191 and 192 and connecting both ends thereof to the partial sleeves contiguous thereto. In Embodiment 9, the parallel sleeve portion 711 as in Embodiment 1 is omitted.

The inclined sleeve portion 7121 is inserted to the inclined gap 62, and the urge sleeve portion 7134 is inserted to an inner side circular shape gap 63 between the connecting face 544 in the circular arc shape and the connecting face 444 in the circular arc shape. Further, an outer end in the radial direction of the inclined sleeve portion 7121 is formed with a connecting sleeve portion 7145 in a waveform shape, the connecting sleeve portion 7145 is inserted to an outer side circular arc shape gap 64 between a bottom face 442 in a circular arc shape and a top face 542 in a circular arc shape to be connected to an outer end in a radial direction of the inclined sleeve portion 7121 contiguous thereto.

The urge sleeve portion 7134 and the connecting sleeve portion 7145 are formed to be thinner than the inclined sleeve portion 7121. Therefore, when the sleeve 71 is outwardly fitted to the outer periphery of the male shaft 12B, diameters of the urge sleeve portion 7134 and the connecting sleeve portion 7145 are elastically expanded to the outer side in the radial direction, and the sleeve 71 can outwardly be fitted easily to the outer periphery of the male shaft 12B.

A wall thickness of the urge sleeve portion 7134 is formed to be thinner than that of the interval of the inner side circular arc shape gap 63 between the connecting face 544 in the circular arc shape and the connecting face 444 in the circular arc shape, the urge sleeve portion 7134 is elastically formed by being folded to bend in a convex shape to the side of the axis center 19 and is formed by being bent into a waveform of one mountain. Further, an apex of the mountain of the waveform is always brought into contact with the connecting face 544 of the male shaft 12B. Therefore, the urge sleeve portion 7134 is elastically deformed freely at inside of the inner side circular arc shape gap 63 to be able to always apply an urge force to an inclined sleeve portion 7121.

Further, a wall thickness of the connecting sleeve portion 7145 is formed to be thinner than that of Embodiment 1 and is formed by being bent into a waveform of one mountain. Further, an apex of the mountain of the waveform is always brought into contact with the top face 542 of the male shaft 12B and a gap is always provided between the mountain and the bottom face 442 of the female shaft 12A. Therefore, the connecting sleeve portion 7145 is elastically deformed freely at inside of an outer side circular arc shape gap 64 to enable to elastically deform smoothly the connecting sleeve portion 7145 by following movement of the inclined sleeve portion 7121.

Since the urge sleeve portion 7134 is elastically deformed, the inclined sleeve portion 7121 is operated with an urge force in a direction of pressing the inclined sleeve portion 7121 to the inclined gap 62 by an elastic force of the urge sleeve portion 7134. Therefore, there is not backlash between the male shaft 12B and the female shaft 12A, further, a predetermined preload is applied between the male shaft 12B and the female shaft 12A. As shown by FIG. 20, a wedge angle θ4 of the inclined sleeve portion 7121 is set to be equal to or smaller than a friction angle (5.7 degrees through 23 degrees) of the inclined sleeve portion 7121.

Next, as shown by FIG. 19, projected portions 545, 545 are formed by calking to be projected to the outer side in the radial direction at top faces 542, 542 of 2 portions having phases different from each other by 180 degrees (2 portions in up and down directions of FIG. 19) of the outer periphery of the male shaft 12B and at both end portions of the sleeve 71. The projected portions 545, 545 are brought into contact with two end portions in the axial direction of the sleeve 71 to be fixed such that the sleeve 71 is not moved relatively to the male shaft 12B in the axial direction. As other example, the sleeve 71 may be fixed to the female shaft 12A to be unable to move in the axial direction.

Successively, as shown by FIGS. 17A and 17B, the female shaft 12A is outwardly fitted to the male shaft 12B outwardly fitted with the sleeve 71. Then, since an outer periphery of the inclined sleeve portion 7121 is provided with a predetermined fastening margin relative to the side face 441 of the female shaft 12A, when the female shaft 12A is outwardly fitted to the male shaft 12B against the fastening margin, the inclined sleeve portion 7121 is smoothly moved in an arrow mark D direction of FIG. 20.

When an inclined sleeve portion 7121 is moved in the arrow mark D direction, as shown by FIG. 20, the urge sleeve portion 7134 formed to be thin-walled is elastically formed freely at inside of the inner side circular arc shape gap 63 by being pressed by the inclined sleeve portion 7121 to move the inclined sleeve portion 7121 smoothly in the arrow mark D direction.

Further, the connecting sleeve portion 7145 is formed to be bent into a waveform of one mountain, an apex of the mountain of the waveform is always brought into contact with the top face 542 of the male shaft 12B, and a gap is always provided between the mountain and the bottom face 442 of the female shaft 12A. Therefore, the connecting sleeve portion 7145 is elastically deformed freely at inside of the outer side circular arc shape gap 64 to smoothly move the inclined sleeve portion 7121 in the arrow mark D direction.

Since the urge sleeve portion 7134 is elastically deformed, the inclined sleeve portion 7121 is operated with an urge force in a direction of pressing the inclined sleeve portion 7121 to the inclined gap 62 by an elastic force of the urge sleeve portion 7134. Therefore, there is not backlash between the male shaft 12B and the female shaft 11A, further, a predetermined preload is applied between the male shaft 12B and the female shaft 12A.

When the position in the front and rear direction of the vehicle body of the steering wheel 11 is adjusted under the state, the outer column 13A is telescopically moved relative to the inner column 13B, and the female shaft 12A is slid in the axial direction relative to the male shaft 12B.

By sliding the female shaft 12A in the axial direction, the outer periphery of the inclined sleeve portion 7121 is slid while being always brought into contact with the side face 441 of the female shaft 12A. Therefore, although the outer periphery of the inclined sleeve portion 7121 is gradually worn by a friction force in sliding, the inclined sleeve portion 7121 is always operated with the urge force in the direction of pressing the inclined sleeve portion 7121 to the inclined gap 62 by the elastic force of the urge sleeve portion 7134, and therefore, the preload is continued.

That is, even when the outer periphery of the inclined sleeve portion 7121 is worn, the inclined sleeve portion 7121 is further pressed by the elastic force of the urge sleeve portion 7134 from a maximum gap portion on a lower side of the inclined gap 62 to a minimum gap portion on an upper side thereof by an amount of wearing the outer periphery of the inclined sleeve portion 7121. Therefore, the inclined sleeve portion 7121 is always operated with the predetermined urge force.

When a wheel (not illustrated) is steered by rotating the sliding wheel 11 in the clockwise direction, in view from FIG. 20, a rotational torque is operated between the female shaft 12A and the male shaft 12B, as shown by FIG. 20, the female shaft 12A is operated with the load F1, the male shaft 12B is operated with the load F2 having a magnitude the same as that of the load F1 and in a direction opposed thereto.

Since the wedge angle θ4 of the inclined sleeve portion 7121 is set to be equal to or smaller than a friction angle of the inclined sleeve portion 7121, the inclined sleeve portion 7121 is not moved in the arrow mark D direction. Therefore, there is not backlash between the male shaft 12B and the female shaft 12A, further, a state of applying the predetermined preload between the male shaft 12B and the female shaft 12A is maintained, and a rotational torque is transmitted from the female shaft 12A to the male shaft 12B between the outer periphery of the inclined sleeve portion 7121 and the side face 441 of the female shaft 12A.

When the outer periphery of the sleeve 71 of Embodiment 9 is formed with a plurality of recess portions (refer to FIGS. 8A and 8B of Embodiment 1) 715 for storing a lubricant in a ring-like shape over an entire periphery, the lubricant is stably supplied to a sliding face of the outer periphery of the sleeve 71 over a long period of time, and therefore, a slide resistance is maintained to be small in a long period of time, which is preferable.

According to Embodiment 9, the parallel gap 61 and the parallel sleeve portion 711 of Embodiment 1 can be omitted, and therefore, an inner peripheral shape of the female shaft 12A and the shape of the sleeve 71 are simplified, and therefore, cost of fabricating the telescopic shaft can be reduced.

Further, although according to the embodiment, the axial groove 41 is formed on the side of the female shaft 12A and the axial projected streak 51 is formed on the side of the male shaft 12B, the side of the female shaft 12A may be formed with the axial projected streak, and the side of the male shaft 12B may be formed with the axial groove.

Further, although in the above-described embodiment, 4 pieces of the axial grooves 41 and the axial projected streaks 51 are formed at equal intervals, numbers thereof are not limited to 4 pieces but may be plural.

Further, although in the above-described embodiment, an explanation has been given of an example of applying the invention to the steering shaft 12, the invention is applicable to an arbitrary telescopic shaft constituting a steering apparatus of the intermediate shaft 16 or the like.

Further, in the above-described embodiment, the shape of the outer peripheral face of the female shaft 12A having the axial grooves may be constituted by a circular shape, a rectangular shape and a polygonal shape, and it is not necessary to constitute a shape similar to that of the axial groove of the female shaft 12A.

Further, although in the above-described embodiment, the urge sleeve portion urges to press the inclined sleeve portion from the maximum gap portion to the minimum gap portion of the inclined gap, the connecting sleeve may urge the inclined sleeve portion to pull from the maximum gap portion to the minimum gap portion of the inclined gap. Further, the connecting sleeve portion may be functioned as the urge sleeve portion by being elastically deformed when the male shaft 12B is incorporated in the female shaft 12A.

Further, a material of the sleeve 71, a method of forming the female shaft 12A and the male shaft 12B, the plurality of recess portions 715 for storing the lubricant explained in Embodiment 1 are applicable to all of other embodiments.

While the invention has been described in connection with the exemplary embodiments, it will be obvious to those skilled in the art that various changes and modification may be made therein without departing from the present invention, and it is aimed, therefore, to cover in the appended claim all such changes and modifications as fall within the true spirit and scope of the present invention.

What is claimed is:

1. A telescopic shaft comprising:
    a male shaft having a noncircular outer peripheral shape;
    a female shaft having a noncircular inner peripheral shape, being outwardly fitted to an outer periphery of the male shaft so as to move relative thereto in an axial direction and transmit a rotational torque;

an inclined gap formed at a gap between the noncircular outer periphery and the noncircular inner periphery, and changing an interval therebetween at a predetermined inclination;

an inclined sleeve portion inserted to the inclined gap, and always coming into contact with both the noncircular inner periphery of the female shaft and the noncircular outer periphery of the male shaft; and an urge sleeve portion capable of an elastic deformation, inserted to the gap between the noncircular outer periphery and the noncircular inner periphery, and urging the inclined sleeve portion from a side of a maximum gap portion of the inclined gap toward a side of a minimum gap portion thereof to apply a preload.

2. The telescopic shaft according to claim 1,
wherein either one of the inner periphery of the female shaft or the outer periphery of the male shaft is formed with a plurality of axial grooves substantially radially from an axis center,
wherein other of the inner periphery of the female shaft or the outer periphery of the male shaft is formed with a plurality of axial projected streaks having gaps between the axial grooves, at positions of phases the same as positions of phases of the axial grooves substantially radially from the axis center, and
wherein the inclined sleeve portion and the urge sleeve portion are inserted to the gaps formed between the axial grooves and the axial projected streaks.

3. The telescopic shaft according to claim 1,
wherein a plurality of partial sleeves constituted by two elements of the inclined sleeve portion and the urge sleeve portion are arranged at the gap between the noncircular outer periphery and the noncircular inner periphery, and both ends of the partial sleeves are continuously connected to each other so as to be formed in a ring-like shape.

4. The telescopic shaft according to claim 1,
wherein a wedge angle of the inclined sleeve portion is set to be equal to or smaller than a friction angle of the inclined sleeve portion.

5. The telescopic shaft according to claim 1,
wherein urge sleeve portion is formed to come into contact with at least any one of the outer periphery of the male shaft or the inner periphery of the female shaft.

6. The telescopic shaft according to claim 1,
wherein the urge sleeve portion is formed in a waveform shape.

7. The telescopic shaft according to claim 1,
wherein the urge sleeve portion is formed to be more thin-walled than the inclined sleeve portion.

8. The telescopic shaft according to claim 1,
wherein the partial sleeve is outwardly fitted to the outer periphery of the male shaft, and then the inner periphery of the female shaft is outwardly fitted to the outer periphery of the male shaft, and then the outer periphery of the female shaft is pressed to contract a diameter thereof.

9. The telescopic shaft according to claim 1,
wherein the inclined sleeve portion and the urge sleeve portion are fixed to the outer periphery of the male shaft to be unable to move relative thereto in the axial direction.

10. The telescopic shaft according to claim 1,
wherein a recess portion for storing a lubricant is formed at a face of at least any one of the inclined sleeve portion or the urge sleeve portion, coming into contact with the inner periphery of the female shaft, or the inner periphery of the female shaft.

11. The telescopic shaft according to claim 1,
wherein the parallel sleeve portion, the inclined sleeve portion and the urge sleeve portion are fixed to the inner periphery of the female shaft to be unable to move relative thereto in the axial direction.

12. A steering apparatus including the telescopic shaft according to claim 1.

13. A telescopic shaft comprising:
a male shaft having a noncircular outer peripheral shape;
a female shaft having a noncircular inner peripheral shape outwardly fitted to an outer periphery of the male shaft so as to move relative thereto in an axial direction and transmit a rotational torque;
a parallel gap formed at a gap between the noncircular outer periphery and the noncircular inner periphery and having a substantially constant interval;
an inclined gap formed at the gap between the noncircular outer periphery and the noncircular inner periphery, and changing an interval therebetween at a predetermined inclination, and continuously connecting either one of a maximum gap portion or a minimum gap portion to the parallel gap;
a parallel sleeve portion capable of an elastic deformation, being inserted to the parallel gap and coming into contact with both the noncircular inner periphery of the female shaft and the noncircular outer periphery of the male shaft when a predetermined rotational torque is operated thereto;
an inclined sleeve portion capable of an elastic deformation, being inserted to the inclined gap, continuously connected to the parallel sleeve portion, and always coming into contact with both the noncircular inner periphery of the female shaft and the noncircular outer periphery of the male shaft; and
an urge sleeve portion capable of an elastic deformation, being inserted to the gap between the noncircular outer periphery and the noncircular inner periphery, continuously connected to the parallel sleeve portion or the inclined sleeve portion, and urging the inclined sleeve portion from a side of a maximum gap portion of the inclined gap toward a side of a minimum gap portion thereof to apply a preload.

14. The telescopic shaft according to claim 13,
wherein a wedge angle of the inclined sleeve portion is set to be larger than a friction angle of the inclined sleeve portion.

15. The telescopic shaft according to claim 13,
wherein the outer periphery of the male shaft and the inner periphery of the female shaft are formed in a rectangular shape, and
wherein the parallel sleeve portion, the inclined sleeve portion and the urge sleeve portion are inserted to a gap formed between the rectangular outer periphery and the rectangular inner periphery.

16. The telescopic shaft according to claim 13,
wherein a plurality of partial sleeves constituted by three elements of the parallel sleeve portion, the inclined sleeve portion and the urge sleeve portion are arranged at the gap between the noncircular outer periphery and the noncircular inner periphery, and both ends of the partial sleeves are continuously connected to each other so as to be formed in a ring-like shape.

17. The telescopic shaft according to claim 13,
wherein either one of the inner periphery of the female shaft or the outer periphery of the male shaft is formed with a plurality of axial grooves substantially radially from an axis center, wherein other of the inner periphery of the female shaft or the outer periphery of the male shaft is formed with a plurality of axial projected streaks having gaps between the axial grooves, at positions of phases the same as positions of phases of the axial grooves substantially radially from the axis center, and wherein the parallel sleeve portion, the inclined sleeve portion and the urge sleeve portion are inserted to a gap formed between the axial grooves and the axial projected streaks.

18. The telescopic shaft according to claim 13, wherein the parallel sleeve portion is movable in a peripheral direction along the parallel gap, wherein the inclined sleeve portion is movable in the peripheral direction along the inclined gap.

19. A telescopic shaft comprising:

a male shaft;

a female shaft outwardly fitted to the male shaft so as to move relative thereto in an axial direction and transmit a rotational torque;

a plurality of axial grooves formed at either of an inner periphery of the female shaft, or an outer periphery of the male shaft substantially radially from an axis center;

a plurality of axial projected streaks formed at other of the inner periphery of the female shaft or the outer periphery of the male shaft at positions of phases the same as positions of phases of the axial grooves substantially radially from the axis center and having gaps between the axial grooves;

a parallel gap formed at the gap between the axial groove and the axial projected streak and having a substantially constant interval in a radial direction;

an inclined gap formed at the gap between the axial groove and the axial projected streak, changing an interval in the radial direction at a predetermined inclination, and continuously connecting either of a maximum gap portion or a minimum gap portion thereof to the parallel gap;

a parallel sleeve portion capable of an elastic deformation, being inserted to the parallel gap and coming into contact with both the inner periphery of the female shaft and the outer periphery of the male shaft when a predetermined rotational torque is operated thereto;

an inclined sleeve portion capable of an elastic deformation, being inserted to the inclined gap, continuously connected to the parallel sleeve portion, and always coming into contact with both the inner periphery of the female shaft and the outer periphery of the male shaft; and an urge sleeve portion capable of an elastic deformation, being inserted to the gap between the axial groove and the axial projected streak, continuously connected to the parallel sleeve portion or the inclined sleeve portion, and urging the inclined sleeve portion from a side of a maximum gap portion of the inclined gap toward a side of a minimum gap portion thereof to apply a preload.

* * * * *